US011859796B2

(12) United States Patent
Tickner et al.

(10) Patent No.: US 11,859,796 B2
(45) **Date of Patent: *Jan. 2, 2024**

(54) LIGHT EMITTING DIODE RECESSED LIGHT FIXTURE

(71) Applicant: SIGNIFY HOLDING B.V., Eindhoven (NL)

(72) Inventors: Jerold Tickner, Newnan, GA (US); Scott David Wegner, Peachtree City, GA (US); Evans Edward Thompson, III, Fairburn, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,764

(22) Filed: Jan. 26, 2023

(65) Prior Publication Data

US 2023/0167968 A1 Jun. 1, 2023

Related U.S. Application Data

(63) Continuation of application No. 16/853,962, filed on Apr. 21, 2020, now Pat. No. 11,570,875, which is a (Continued)

(51) Int. Cl.

*F21V 21/04* (2006.01)
*F21V 29/78* (2015.01)

(Continued)

(52) U.S. Cl.

CPC ................ *F21V 21/04* (2013.01); *F21S 8/02* (2013.01); *F21S 8/026* (2013.01); *F21V 7/09* (2013.01);

(Continued)

(58) Field of Classification Search

CPC ........ F21V 21/04; F21V 21/048; F21V 29/70; F21V 29/74; F21V 29/75; F21V 29/78;

(Continued)

(56) References Cited

U.S. PATENT DOCUMENTS 1,197,187 A 9/1916 Crownfield
1,281,752 A 10/1918 Bailey (Continued)

FOREIGN PATENT DOCUMENTS

CN 2516813 Y 10/2002
CN 1731007 A 2/2006

(Continued)

OTHER PUBLICATIONS

PR Decision. IPR2017-01858. Feb. 14, 2018.

(Continued)

*Primary Examiner* — Thomas M Sember

(57) ABSTRACT

A recessed light fixture includes an LED module, which includes a single LED package that is configured to generate all light emitted by the recessed light fixture. For example, the LED package can include multiple LEDs mounted to a common substrate. The LED package can be coupled to a heat sink for dissipating heat from the LEDs. The heat sink can include a core member from which fins extend. Each fin can include one or more straight and/or curved portions. A reflector housing may be coupled to the heat sink and configured to receive a reflector. The reflector can have any geometry, such as a bell-shaped geometry including two radii of curvature that join together at an inflection point. An optic coupler can be coupled to the reflector housing and configured to cover electrical connections at the substrate and to guide light emitted by the LED package.

17 Claims, 12 Drawing Sheets

Related U.S. Application Data continuation of application No. 15/646,384, filed on Jul. 11, 2017, now Pat. No. 10,634,321, which is a continuation of application No. 14/569,896, filed on Dec. 15, 2014, now Pat. No. 9,709,253, which is a continuation of application No. 13/965,026, filed on Aug. 12, 2013, now Pat. No. 8,911,121, which is a continuation of application No. 13/735,655, filed on Jan. 7, 2013, now Pat. No. 8,789,978, which is a continuation of application No. 13/431,439, filed on Mar. 27, 2012, now Pat. No. 8,348,477, which is a continuation of application No. 13/109,490, filed on May 17, 2011, now Pat. No. 8,348,479, which is a continuation of application No. 12/235,116, filed on Sep. 22, 2008, now Pat. No. 7,959,332.

(60) Provisional application No. 61/090,391, filed on Aug. 20, 2008, provisional application No. 61/065,914, filed on Feb. 15, 2008, provisional application No. 61/010,549, filed on Jan. 9, 2008, provisional application No. 60/994,792, filed on Sep. 21, 2007.

(51) Int. Cl.

| | |
|---|---|
| ***F21S 8/02*** | (2006.01) |
| ***F21V 7/09*** | (2006.01) |
| ***F21V 29/74*** | (2015.01) |
| ***F21V 29/75*** | (2015.01) |
| ***F21V 29/70*** | (2015.01) |
| ***H05B 47/185*** | (2020.01) |
| ***H05B 45/382*** | (2020.01) |
| ***F21V 23/00*** | (2015.01) |
| ***F21V 15/01*** | (2006.01) |
| ***F21Y 115/10*** | (2016.01) |

(52) U.S. Cl.
CPC ............ *F21V 23/009* (2013.01); *F21V 29/70* (2015.01); *F21V 29/74* (2015.01); *F21V 29/75* (2015.01); *F21V 29/78* (2015.01); *H05B 45/382* (2020.01); *H05B 47/185* (2020.01); *F21V 15/01* (2013.01); *F21V 21/048* (2013.01); *F21Y 2115/10* (2016.08)

(58) Field of Classification Search
CPC .......... F21V 7/09; F21V 23/009; F21V 15/01; F21S 8/02; F21S 8/026; H05B 45/382; F21Y 2115/10
See application file for complete search history.

(56) References Cited

U.S. PATENT DOCUMENTS

| | | | | |
|---|---|---|---|---|
| 1,447,238 | A | 3/1923 | Crownfield | |
| 1,711,478 | A | 4/1929 | Halvorson, Jr. | |
| 1,821,733 | A | 9/1931 | Thibodeau | |
| 2,802,933 | A | 8/1957 | Broadwin | |
| 3,040,172 | A | 6/1962 | Kingsley | |
| 4,091,444 | A | 5/1978 | Mori | |
| 4,313,154 | A | 1/1982 | Capostagno et al. | |
| 4,336,575 | A | 6/1982 | Gilman | |
| 4,388,677 | A | 6/1983 | Druffel | |
| 4,399,497 | A | 8/1983 | Druffel | |
| 4,475,147 | A | 10/1984 | Kristofek | |
| 4,511,113 | A | 4/1985 | Druffel et al. | |
| 4,729,080 | A | 3/1988 | Fremont et al. | |
| 4,754,377 | A | 6/1988 | Wenman | |
| 4,803,603 | A | 2/1989 | Carson | |
| 4,829,410 | A | 5/1989 | Patel | |
| 4,910,650 | A | 3/1990 | Goralnik | |
| 4,930,054 | A | 5/1990 | Krebs | |
| 4,972,339 | A | 11/1990 | Gabrius | |
| 5,057,979 | A | 10/1991 | Carson et al. | |
| 5,073,845 | A | 12/1991 | Aubrey | |
| 5,075,831 | A | 12/1991 | Stringer et al. | |
| 5,130,913 | A | 7/1992 | David | |
| 5,222,800 | A | 6/1993 | Chan et al. | |
| 5,374,812 | A | 12/1994 | Chan et al. | |
| 5,379,199 | A | 1/1995 | Hirshenhorn et al. | |
| 5,452,816 | A | 9/1995 | Chan et al. | |
| 5,457,617 | A | 10/1995 | Chan et al. | |
| 5,463,540 | A | 10/1995 | Jones | |
| 5,505,419 | A | 4/1996 | Gabrius | |
| 5,597,234 | A | 1/1997 | Winkelhake | |
| 5,662,414 | A | 9/1997 | Jennings et al. | |
| 5,673,997 | A | 10/1997 | Akiyama | |
| 5,690,423 | A | 11/1997 | Hentz et al. | |
| 5,738,436 | A | 4/1998 | Cummings et al. | |
| 5,746,507 | A | 5/1998 | Lee | |
| 5,758,959 | A | 6/1998 | Sieczkowski | |
| 5,826,970 | A | 10/1998 | Keller et al. | |
| 5,838,247 | A | 11/1998 | Bladowski | |
| 5,857,766 | A | 1/1999 | Sieczkowski | |
| 5,951,151 | A | 9/1999 | Doubeck et al. | |
| 5,957,573 | A | 9/1999 | Wedekind et al. | |
| 5,957,574 | A | 9/1999 | Hentz et al. | |
| 6,030,102 | A | 2/2000 | Gromotka | |
| 6,082,878 | A | 7/2000 | Doubek et al. | |
| 6,095,671 | A | 8/2000 | Hutain | |
| 6,152,583 | A | 11/2000 | Langner | |
| 6,203,173 | B1 | 3/2001 | Duff et al. | |
| 6,234,643 | B1 | 5/2001 | Lichon, Jr. | |
| 6,283,430 | B1 | 9/2001 | Schubert et al. | |
| 6,286,265 | B1 | 9/2001 | Rinderer | |
| 6,343,871 | B1 | 2/2002 | Yu | |
| 6,343,873 | B1 | 2/2002 | Eberhard et al. | |
| 6,350,043 | B1 | 2/2002 | Gloisten | |
| 6,350,046 | B1 * | 2/2002 | Lau | F21V 29/15 362/147 |
| 6,364,511 | B1 | 4/2002 | Cohen | |
| 6,367,949 | B1 | 4/2002 | Pederson | |
| 6,431,723 | B1 * | 8/2002 | Schubert | F21V 7/0025 362/306 |
| 6,461,016 | B1 | 10/2002 | Jamison et al. | |
| 6,476,726 | B1 | 11/2002 | Pederson | |
| 6,505,960 | B2 | 1/2003 | Schubert et al. | |
| 6,520,655 | B2 | 2/2003 | Ohuchi | |
| 6,554,457 | B1 | 4/2003 | Platt | |
| 6,578,983 | B2 | 6/2003 | Holten | |
| 6,588,922 | B1 | 7/2003 | DeCicco | |
| 6,636,003 | B2 | 10/2003 | Rahm et al. | |
| 6,726,347 | B2 | 4/2004 | Wronski | |
| 6,787,999 | B2 | 9/2004 | Stimac et al. | |
| 6,853,151 | B2 | 2/2005 | Leong et al. | |
| 6,976,769 | B2 | 12/2005 | McCullough et al. | |
| 6,997,583 | B2 | 2/2006 | Broelemann | |
| 7,011,430 | B2 | 3/2006 | Chen | |
| 7,018,070 | B2 | 3/2006 | McCoy | |
| 7,021,486 | B1 | 4/2006 | Hurlbut | |
| 7,033,036 | B2 | 4/2006 | Pederson | |
| 7,052,171 | B1 | 5/2006 | Lefebvre et al. | |
| 7,138,667 | B2 | 11/2006 | Barnett et al. | |
| 7,144,135 | B2 | 12/2006 | Martin et al. | |
| 7,145,179 | B2 | 12/2006 | Petroski | |
| 7,213,940 | B1 | 5/2007 | Van De Ven et al. | |
| 7,229,196 | B2 | 6/2007 | Hulse | |
| 7,258,467 | B2 | 8/2007 | Saccomanno et al. | |
| 7,357,541 | B2 | 4/2008 | Gamache et al. | |
| 7,374,308 | B2 | 5/2008 | Sevack et al. | |
| 7,396,146 | B1 | 7/2008 | Wang | |
| 7,434,962 | B2 | 10/2008 | Stache | |
| 7,503,672 | B2 | 3/2009 | Ho | |
| 7,524,089 | B2 | 4/2009 | Park | |
| 7,568,817 | B2 | 8/2009 | Lee et al. | |
| 7,572,038 | B2 * | 8/2009 | Kinnune | F21S 8/04 362/147 |
| 7,626,210 | B2 | 12/2009 | Shchekin et al. | |
| 7,629,570 | B2 | 12/2009 | Mondloch et al. | |
| 7,658,517 | B2 | 2/2010 | Czech et al. | |
| 7,670,021 | B2 | 3/2010 | Chou | |
| 7,670,028 | B2 | 3/2010 | Liu et al. | |

(56) References Cited

U.S. PATENT DOCUMENTS 7,677,770 B2 3/2010 Mazzochette
7,686,483 B1 3/2010 Aubrey
7,699,505 B2 4/2010 Yang
7,703,951 B2 4/2010 Piepgras et al.
7,712,949 B2 5/2010 Tufano et al.
7,722,227 B2 5/2010 Zhang et al.
7,740,380 B2 6/2010 Thrailkill
7,744,259 B2 6/2010 Walczak et al.
7,762,829 B2 7/2010 Daily et al.
7,766,512 B2 8/2010 Chou et al.
7,766,518 B2 8/2010 Piepgras et al.
7,781,787 B2 8/2010 Suehiro et al.
7,784,969 B2 8/2010 Reisenauer et al.
7,784,979 B2 8/2010 Wronski et al.
D624,691 S 9/2010 Zhang et al.
7,794,114 B2 9/2010 Medendorp, Jr.
7,828,465 B2 11/2010 Roberge et al.
7,862,214 B2 1/2011 Trott et al.
7,866,850 B2 1/2011 Alexander et al.
7,878,683 B2 2/2011 Logan et al.
7,954,979 B2 6/2011 Sommers et al.
7,959,329 B2 6/2011 Van De Ven
7,959,332 B2 6/2011 Tickner et al.
7,967,480 B2 6/2011 Pickard et al.
7,988,336 B1 8/2011 Harbers et al.
7,993,034 B2 8/2011 Wegner
7,997,761 B2 8/2011 Peck et al.
8,167,468 B1 5/2012 Olsson et al.
8,172,425 B2 5/2012 Wen et al.
8,201,977 B2 6/2012 Thomas et al.
8,246,203 B2 8/2012 Hancock et al.
8,258,722 B2 9/2012 Swoboda et al.
8,330,387 B2 12/2012 York et al.
8,348,477 B2 1/2013 Tickner et al.
8,376,577 B2 2/2013 Harbers et al.
8,390,207 B2 3/2013 Dowling et al.
8,398,262 B2 3/2013 Sloan et al.
8,403,541 B1 3/2013 Rashidi
8,408,759 B1 4/2013 Rashidi
8,425,085 B2 4/2013 Van Laanen et al.
8,454,202 B2 6/2013 Markle et al.
8,485,700 B2 7/2013 Ngai
8,905,602 B2 12/2014 Thompson, III
2004/0066142 A1 4/2004 Stimac et al.
2004/0240182 A1 12/2004 Shah
2005/0068771 A1 3/2005 You et al.
2005/0068776 A1 3/2005 Ge
2005/0168999 A1 8/2005 Sommers et al.
2005/0169015 A1 8/2005 Luk et al.
2005/0174780 A1 8/2005 Park
2005/0183344 A1 8/2005 Ziobro et al.
2005/0265016 A1 12/2005 Rappaport
2006/0006405 A1 1/2006 Mazzochette
2006/0108137 A1 5/2006 Smith
2006/0215422 A1 9/2006 Laizure et al.
2006/0250788 A1 11/2006 Hodge et al.
2006/0262542 A1 11/2006 Ibbitson et al.
2007/0008716 A1 1/2007 Glickman
2007/0041220 A1 2/2007 Lynch
2007/0139920 A1* 6/2007 Van De Ven .......... H05B 45/20 362/231
2007/0139923 A1 6/2007 Negley et al.
2007/0165413 A1 7/2007 Sanner et al.
2007/0189001 A1 8/2007 Nielson et al.
2007/0279903 A1 12/2007 Negley et al.
2008/0037255 A1 2/2008 Wang
2008/0080188 A1 4/2008 Wang
2008/0080189 A1 4/2008 Wang
2008/0084701 A1 4/2008 Van De Ven et al.
2008/0106895 A1 5/2008 Van De Ven et al.
2008/0106907 A1* 5/2008 Trott ....................... F21V 29/89 362/368
2008/0112168 A1 5/2008 Pickard et al.
2008/0112170 A1 5/2008 Trott et al.
2008/0112171 A1 5/2008 Patti et al.
2008/0123362 A1 5/2008 Thorneycroft et al.
2008/0130298 A1 6/2008 Negley et al.
2008/0130317 A1 6/2008 Shimura et al.
2008/0137347 A1 6/2008 Trott et al.
2008/0165535 A1 7/2008 Mazzochette
2008/0274641 A1 11/2008 Weber et al.
2008/0285271 A1 11/2008 Roberge et al.
2008/0304269 A1 12/2008 Pickard et al.
2009/0073688 A1 3/2009 Patrick
2009/0073689 A1 3/2009 Patrick
2009/0080189 A1 3/2009 Wegner
2009/0086474 A1 4/2009 Chou
2009/0086476 A1 4/2009 Tickner et al.
2009/0086481 A1 4/2009 Wegner
2009/0086487 A1 4/2009 Ruud et al.
2009/0097262 A1 4/2009 Zhang et al.
2009/0116243 A1 5/2009 Condon et al.
2009/0129086 A1 5/2009 Thompson, III
2009/0141506 A1 6/2009 Lan et al.
2009/0154166 A1 6/2009 Zhang et al.
2009/0161356 A1 6/2009 Negley et al.
2009/0195159 A1 8/2009 Smith
2009/0262530 A1 10/2009 Tickner et al.
2009/0290343 A1 11/2009 Brown et al.
2009/0290361 A1 11/2009 Ruud et al.
2010/0002440 A1 1/2010 Negley et al.
2010/0002451 A1 1/2010 Reynolds
2010/0061108 A1* 3/2010 Zhang .................. F21V 29/713 362/364
2010/0085766 A1 4/2010 Czech et al.
2010/0110699 A1 5/2010 Chou
2010/0328960 A1 12/2010 Wang
2011/0047841 A1 3/2011 Senkyr et al.
2011/0075414 A1 3/2011 Van De Ven et al.
2011/0194285 A1 8/2011 Harbers et al.
2012/0002419 A1 1/2012 Zaderej et al.
2012/0106177 A1 5/2012 Blankestijn et al.
2013/0242574 A1 9/2013 Guercio et al.

FOREIGN PATENT DOCUMENTS

CN 1793719 A 6/2006
CN 2791469 Y 6/2006
CN 1809674 A 7/2006
CN 2809413 Y 8/2006
CN 2864360 Y 1/2007
CN 200979140 Y 11/2007
CN 201059525 Y 5/2008
DE 1151324 B 7/1963
DE 9419593 U1 3/1995
DE 102004042186 A1 3/2006
DE 202006009553 U1 8/2006
DE 202007009655 U1 9/2007
EP 1139439 A1 10/2001
EP 1600691 A1 11/2005
EP 1950491 A1 7/2008
EP 1873448 B1 10/2010
EP 2711626 B1 2/2017
EP 2775195 B1 7/2017
JP 05073999 A 3/1993
JP 2007234417 A 9/2007
JP 2008186776 A 8/2008
JP 2010049830 A 3/2010
KR 200429206 Y1 10/2006
KR 102008039847 A 5/2008
WO 2005034197 A2 4/2005
WO 2006017930 A1 2/2006
WO 2006023149 A2 3/2006
WO 2006105346 A2 10/2006
WO 2007071953 A1 6/2007
WO 2009101551 A1 8/2009
WO 2009102003 A1 8/2009
WO 2010061746 A1 6/2010

(56) References Cited

FOREIGN PATENT DOCUMENTS

WO 2010107781 A2 9/2010
WO 2014/059567 A1 4/2014

OTHER PUBLICATIONS

PR Decision. IPR2017-01857. Feb. 14, 2018.
PR Decision. IPR2017-01860. Feb. 14, 2018.
Petitioner's Exhibit 1014, Declaration of Fred Smith, IPR Trial No. 2017-01858, Jul. 24, 2017.
Petitioner's Exhibit 1014, Declaration of Fred Smith, IPR Trial No. 2017-1857, Jul. 24, 2017.
Petitioner's Exhibit 1014, Declaration of Fred Smith, IPR Trial No. 2017-01860, Jul. 24, 2017.
Joint Claim Construction Statement Pursuant to Local Patent Rule 6.3, Mar. 3, 2017.
Petition For Inter Partes Review of U.S. Pat. No. 8,789,978, Trial No. 2017-01860, Jul. 24, 2017.
Petition For Inter Partes Review of U.S. Pat. No. 8,348,479, IPR Trial No.; 2017-01858, Jul. 24, 2017.
Petition For Inter Partes Review of U.S. Pat. No. 8348477, IPR Trial No. 2017-1857, Jul. 24, 2017.
Cooper Lighting's Complaint for Patent Infringement; United States District Court Central District of California Western Division; CV12 0523 dated Jan. 19, 2012.
Report on the filing or determination of an action regarding a Patent or Trademark; Form AO 120; CV 12 0523 dated Jan. 19, 2012.
PCT Search Report, Written Opinion for PCT/US2008/077212 dated Nov. 24, 2008.
Cree LED Lighting Product Description; 6" Recessed downlight; LR6; Jul. 2009.
Cree Press Release "LED Lighting Fixtures Announces Its First LED-Based Recessed Down Light" Jul. 2, 2007.
Cree Press Release "Award Winning Custom Home Builder Chooses LED Lighting Fixtures" Mar. 20, 2007.
Cree Press Release "LED Lighting Fixtures Announces New Commercial Opportunity for LR6 Down-light" May 3, 2007.
Cree Press Release "University of Arkansas to Install LED Lighting Fixture's Downlights" Jun. 25, 2007.
Cree Press Release "LED Lighting Fixtures Inc. achieves unprecedented gain in light output from new luminaire" Apr. 26, 2006.
Cree Press Release "Cree LR" Led Light Wins Silver International Design Excellence Award (IDEA) Jul. 18, 2008.
Lighting for Tomorrow 2007 Winners Announced; Sep. 11, 2007
Office Action dated Mar. 26, 2012 for U.S. Appl. No. 12/235,146.
Request for Continued Examination filed Jan. 16, 2012 for U.S. Appl. No. 12/235,146.
Advisory Action dated Jan. 6, 2012 for U.S. Appl. No. 12/235,146.
After Final Response filed Dec. 19, 2011 for U.S. Appl. No. 12/235,146.
Final Office Action dated Oct. 18, 2011 for U.S. Appl. No. 12/235,146
Response filed Jul. 15, 2011 for U.S. Appl. No. 12/235,146.
Office Action dated Mar. 15, 2011 for U.S. Appl. No. 12/235,146.
Response filed Jan. 5, 2011 for U.S. Appl. No. 12/235,146.
Office Action dated Oct. 6, 2010 for U.S. Appl. No. 12/235,146.
Office Action dated Mar. 24, 2010 for U.S. Appl. No. 12/235,127.
Response filed Jun. 24, 2010 for U.S. Appl. No. 12/235,127.
Final Office Action dated Jul. 30, 2010 for U.S. Appl. No. 12/235,127.
Request for Continued Examination filed Nov. 30, 2010 for U.S. Appl. No. 12/235,127.
Notice of Allowance dated Feb. 4, 2011 for U.S. Appl. No. 12/235,127.
Office Action dated Feb. 1, 2011 for U.S. Appl. No. 12/235,141.
Interview Summary dated Jun. 3, 2011 for U.S. Appl. No. 12/235,141.
Final Office Action dated Oct. 18, 2011 for U.S. Appl. No. 12/235,146.
Response filed Jul. 15, 2011 for U.S. Appl. No. 12/235,146.
WAC HR-88; http://www.ipnlighting.com/hr-88-wt/; Mar. 25, 2009.
Linear ceiling mounted LED luminaire by Ettore Sottsass; http://www.archiexpo.com/prod/zumtobel/linear-ceiling-mounted-led-uminaires-ettore-sottsass-9003-1027891, html; Feb. 7, 2007.
Specialty Lighting, JJI—Lovo Series Downlighting; http://www.lightingresource.com/products/*/*/1673; Feb. 1, 2001.
Amelec; Interior Lighting 2004; http://www.amelec.com/au/pdfs/Giorno%20Luce%20Catalogue.pdf; Jul. 15, 2004.
Surface mounted 7W GX53—metal finish, http://www.efficientlight.co.uk/Light-Fittings/Surface0mounted-7W-Gx53-metal-finish-SURFACE7WGX53.aspx; Feb. 9, 2010.
https://www.1000bulbs.com/pdf/Halo-Brochure.pdf; Jan. 2008; Halo Brochure, Cooper Lighting.
www.lutron.com/en-US/CaseStudyPDF/Omega_OM6LED.pdf; Jun. 2008; OM6LED spec sheet.
Lithonia Lighting; Lithonia Downlighting Brochure; Mar. 2005.
ENBC Series Installation Instructions; Dec. 2005; permalight.
Lighting Research Center; "How to Select Residential LED Directional Lighting", vol. 3, Issue 2, 2007.
LED professional; Review, Nov./Dec. 2007; Review.
Lighting Research Center; Promises and Challenges of LED Technology for Lighting Applicatoins; new Delhi, India, Jun. 8, 2007.
Office Action of CN201410562584 dated Jan. 18, 2017.
International Search Report for PCT/US2015/032965; dated Sep. 3, 2015.
Notice of Allownace for 1/052,359; dated Apr. 20, 2016.
Supplemental European Search Report for EP10802724; dated Sep. 15, 2014.
"Lecture 7: Optical Couplers", doanloaded Sep. 10, 13, from internet, course ee.ust.hk/elec509/notes/Lect7-optical%20couplers.pdf.
Supplemental European Search Report for EP08831466.1, dated Sep. 24, 2013.
Response filed Jul. 1, 2011 for U.S. Appl. No. 12/235,141.
Office Action dated Oct. 18, 2011 for U.S. Appl. No. 12/235,141.
Response filed Jan. 18, 2012 for U.S. Appl. No. 12/235,141.
Office Action for U.S. Appl. No. 12/235,146 dated Oct. 9, 2012.
Office Action for Israeli Patent Application No. 204616 dated Sep. 19, 2012.
Office Action for U.S. Appl. No. 12/235,141 dated on Apr. 6, 2012.
International Search Report filed in PCT/US2010/042442; dated Dec. 31, 2010.
Office Action for U.S. Appl. No. 13/431,439 dated Jun. 19, 2012.
Lighting Research Center; Low-Profile LED Fixtures for Elevators, http:/iwww lrc tpi edu/pro :,rams/solidstate/crloworofikasp; Jul. 15, 2005.
Lightolier; 3/4 Aperture Low Profile 2 Light 13W Twin Tube Fluorescent Non-IC Remodeler Frame-in Kit,http://ww,,,lightolier.com/Ivi1(ACatpdfai!III2TH1R Vi)F; Jul. 1, 2002.
Rounda 17w LED Recessed Downlight—White, http://w'vV,v.qvsdirect.com/mnnda-I 7Yv~led~recessed- own l1ght-, vhite; Oct. 9, 2005.
WAC LED 2" 3W Miniature Recessed Downlight with Open Reflector Square Trim, http:/www. wayfair.com/WAC-LIghting-LED-2-3W-Miniature-Recessed_Downlight_with_Open-Reflector-Square-Trim-HR-LED271R-WAC5799.html; Dec. 4, 2005.
Aurora Lighting; 12V MR16 Pressed Steel IP65 Adjustable Round Low Profile Halogen Downlight White, http://www.ukelectricalsupplies.com/aurora-lighting-an-dll785w.htm#terms; Feb. 3, 2006.
Gotham Lighting; Architectural Downlighting, http://www.acuitybrandslighting.com/Library/PSG/Gotham.pdf; May 2, 2006.
Nora Lighting; NHR-27Q; http://www.noralighting.com/Product.aspx?pid=7707; 6" Shallow Non-IC Line Voltage Remodel Housing, Dec. 30, 2005.
Sea Gull Lighting; LED Surface Mount Downlights By Sea Gull Lighting, http://www.1stoplighting.com/content/SeaGull-LED-Feature/info.aspx; Sep. 4, 2009.
Sea Gull Lighting; 14600S-15 Traverse LED 6" LED Downlight—Retrofit or Ceiling Mount, White, http://www.amazon.com/Sea-Gull-Lighting-14600S-15-Down-light/dp/B007Q6QBMY/ref=pd_sim_sbs_hi_1?ie=UTF8&refRID=13XJYABASAEXZB5HRODT; Oct. 6, 2008.
Color Kinetics; eW Downlight Powercore Surface-mounted LED downlight for general and accent light-ing; http://www.colorkinetics.com/support/datasheets/eW_Downlight_Powercor_gen2_ProductGuide.pdf; Apr. 8, 2009.

(56) References Cited

OTHER PUBLICATIONS

Sea Gull Lighting; The Future of Lighting . . . Today, http://mid-atlanticlighting.com/aml_brochure.pdf; Sep. 4, 2009.
6:LED Down Light Recessed Mount, Low Profile—light downlight, http://www.alibaba.com/showroom/recessed-mounted-downlight.html; Feb. 6, 2020.
LED 100 (Low Profile—Low Energy Downlight), http://virtualshowroom.aesthetics.co.nz/product-view/led-100-te-fluorescent; May 26, 2006.
MP Lighting; Low profile Lighting, http://www.mplighting.com/ProductsOverview.aspx?MainMenu=Interior&SubMenu=RecessedDownlighting&ProductName=L141Z; Feb. 1, 2001.
Lucifer Lighting, http://www.luciferlighting.com/Pdfs/Lucifer_Lighting_Profile_domestic.pdf; Mar. 18, 2008.
Lighting Research Center; http://www.lrc.rpi.edu/resources/publications/Ipbh/073Recessed.pdf; Sep. 27, 2008.
Low profile recessed lighting; http://www.thefind.com/homefurnishings/info-low-profile-recessed-lighting; Sep. 22, 2009.
Signtex Lighting; Moonlite LED Emergency & Night Lighting; http://www.signtexinc.com/PDF/CBS%20Brochure.pdf; Jan. 9, 2008.
LED Coollights; Surface/Recessed Puck Light 1.25" LEDC-9-QL302A; http://wwwledcoollights.com/products/under-counter-lighting; Mar. 18, 2010.
Lighting for under kitchen wall cabinets, shelves and Pelmets; http://www.lightstyles.co.uk/kitchen/under-shelf-lighting/; Sep. 6, 2007.
Downlights; http://www.vibelighting.com/an/images/Vibe-Catalogue-2009-10.pdf; Nov. 1, 2009.
Nora Lighting; http://www.noralighting.com/Category.aspx?cid=465; Sep. 27, 2008.
Famco; Luminaires; http://www.famco.com.au/search.php?q=lamp; Sep. 27, 2008.
Prolite; Specificaiton Sheet; Light Adder; http://www.prolite.com/au/Default.aspx?SiteSearchID=1&ID=/search_results; Sep. 30, 2009.
WAC Lighting 3" Low Voltage Recessed Downlighting; http://www.brandlighting.com/wac_recessed_downlighting-3. htm; Jan. 27, 2007.
Gotham Lighting; Vandal-Resistant CFL Low-prodile Downlight; http://gothamlighting.acuitybrands.com/products/detail102168/gotham-lighting/vrafv/vandal-resistant-cfl-vertical-downlight; Jul. 1, 2009.
Weka Electronics; Wekaled Lights; http://www.wekaelectronics.com/01.html; May 28, 2007.
Lithonia Lighting; http://www.lithonia.com/micro_webs/commercialdownlighting/literature/lithonia%w0downlighting%20catalog pdf; Sep. 15, 2006.
Mini Lights; http://www.lightingfx.com/cat-Minilights-9; Jan. 25, 2006.
Recessed lighting; http://www.bedazzled.uk.com/Light_Fittings.htm; Dec. 19, 2006.
http://www.wfsenate.co.uk/media/uploads/7edd239942fc6982c76c44c3656757f42964a58.pdf; Apr. 27, 2008.
Form Lighting; Audrey MR16; http://www.formlighting.com.au/Brands_Boaz.htm; Aug. 31, 2009.
Rexel Lighting Catalogue; http://222.lighting.co/nz/pdfdownloads/RexelLightingCatalogue_Jun12.pdf; Mar. 5, 2000.
Stellar, http://www.pierlite.com/au/10660/stellar; Jul. 1, 2002.

* cited by examiner

LIGHT EMITTING DIODE RECESSED LIGHT FIXTURE

RELATED APPLICATIONS

This application is a continuation of and claims priority under 35 U.S.C. § 120 to U.S. patent application Ser. No. 16/853,962, filed Apr. 21, 2020, titled "Light Emitting Diode Recessed Light Fixture," which is a continuation of and claims priority under 35 U.S.C. § 120 to U.S. patent application Ser. No. 15/646,384, filed Jul. 11, 2017, titled "Light Emitting Diode Recessed Light Fixture," now U.S. Pat. No. 10,634,321, which is a continuation of and claims priority under 35 U.S.C. § 120 to U.S. patent application Ser. No. 14/569,896, filed Dec. 15, 2014, titled "Light Emitting Diode Recessed Light Fixture," now U.S. Pat. No. 9,709, 253, which was a continuation of U.S. patent application Ser. No. 13/965,026, filed Aug. 12, 2013, titled "Light Emitting Diode Recessed Light Fixture," now U.S. Pat. No. 8,911,121, which was a continuation of U.S. patent application Ser. No. 13/735,655, filed Jan. 7, 2013, titled "Light Emitting Diode Recessed Light Fixture," now U.S. Pat. No. 8,789,978, which was a continuation of U.S. application Ser. No. 13/431,439, filed Mar. 27, 2012, titled "Light Emitting Diode Recessed Light Fixture," now U.S. Pat. No. 8,348, 477, which was a continuation of U.S. patent application Ser. No. 13/109,490, filed May 17, 2011, titled "Light Emitting Diode Recessed Light Fixture" now U.S. Pat. No. 8,348,479, which was a continuation of U.S. patent application Ser. No. 12/235,116, filed Sep. 22, 2008, titled "Light Emitting Diode Recessed Light Fixture", now U.S. Pat. No. 7,959,332, which claims priority under 35 U.S.C. § 119 to U.S. Provisional Patent Application No. 60/994,792, titled "Light Emitting Diode Downlight Can Fixture," filed Sep. 21, 2007, U.S. Provisional Patent Application No. 61/010, 549, titled "Diverging Reflector for Light Emitting Diode or Small Light Source," filed Jan. 9, 2008, U.S. Provisional Patent Application No. 61/065,914, titled "Dimmable LED Driver," filed Feb. 15, 2008, and U.S. Provisional Patent Application No. 61/090,391, titled "Light Emitting Diode Downlight Can Fixture," filed Aug. 20, 2008. The complete disclosure of each of the foregoing priority applications is hereby fully incorporated herein by reference.

TECHNICAL FIELD

The invention relates generally to recessed luminaires, and more particularly, to a light emitting diode downlight can fixture for a recessed luminaire.

BACKGROUND

A luminaire is a system for producing, controlling, and/or distributing light for illumination. For example, a luminaire can include a system that outputs or distributes light into an environment, thereby allowing certain items in that environment to be visible. Luminaires are often referred to as "light fixtures".

A recessed light fixture is a light fixture that is installed in a hollow opening in a ceiling or other surface. A typical recessed light fixture includes hanger bars fastened to spaced-apart ceiling supports or joists. A plaster frame extends between the hanger bars and includes an aperture configured to receive a lamp housing or "can" fixture.

Traditional recessed light fixtures include a lamp socket coupled to the plaster frame and/or the can fixture. The lamp socket receives an incandescent lamp or compact fluorescent lamp ("CFL") discussed above. As is well known in the art, the traditional lamp screws into the lamp socket to complete an electrical connection between a power source and the lamp.

Increasingly, lighting manufacturers are being driven to produce energy efficient alternatives to incandescent lamps. One such alternative was the CFL discussed above. CFLs fit in existing incandescent lamp sockets and generally use less power to emit the same amount of visible light as incandescent lamps. However, CFLs include mercury, which complicates disposal of the CFLs and raises environmental concerns.

Another mercury-free alternative to incandescent lamps is the light emitting diode ("LED"). LEDs are solid state lighting devices that have higher energy efficiency and longevity than both incandescent lamps and CFLs. However, LEDs do not fit in existing incandescent lamp sockets and generally require complex electrical and thermal management systems. Therefore, traditional recessed light fixtures have not used LED light sources. Accordingly, a need currently exists in the art for a recessed light fixture that uses an LED light source.

SUMMARY

The invention provides a recessed light fixture with an LED light source. The light fixture includes a housing or "can" within which an LED module is mounted. The LED module includes a single LED package that generates all or substantially all the light emitted by the recessed light fixture. For example, the LED package can include one or more LEDs mounted to a common substrate. Each LED is an LED die or LED element that is configured to be coupled to the substrate. The LEDs can be arranged in any of a number of different configurations. For example, the LEDs can be arranged in a round-shaped area having a diameter of less than two inches or a rectangular-shaped area having a length of less than two inches and a width of less than two inches.

The LED package can be thermally coupled to a heat sink configured to transfer heat from the LEDs. The heat sink can have any of a number of different configurations. For example, the heat sink can include a core member extending away from the LED package and fins extending from the core member. Each fin can include a curved, radial portion and/or a straight portion. For example, each fin can include a radial portion that extends from the core member, and a straight portion that further extends out from the radial portion. In this configuration, heat from the LEDs can be transferred along a path from the LEDs to the core member, from the core member to the radial portions of the fins, from the radial portions of the fins to their corresponding straight portions, and from the corresponding straight portions to a surrounding environment. Heat also can be transferred by convection directly from the core member and/or the fins to one or more gaps between the fins. The LED package can be coupled directly to the core member or to another member disposed between the LED package and the core member.

A reflector housing can be mounted substantially around the LED package. For example, the reflector housing can be coupled to the heat sink and/or the can. The reflector housing can be configured to receive a reflector and to serve as a secondary heat sink for the LED module. For example, the reflector housing can be at least partially composed of a conductive material for transmitting heat away from the LED package. The reflector can be composed of any material for reflecting, refracting, transmitting, or diffusing light from the LED package. For example, the reflector can comprise a specular, semi-specular, semi-diffuse, or diffuse finish, such as gloss white paint or diffuse white paint. The reflector can have any of a number of different configurations. For example, a cross-sectional profile of the reflector can have a substantially bell-shaped geometry that includes a smooth curve comprising an inflection point. Top and bottom portions of the curve are disposed on opposite sides of the inflection point. To meet a requirement of a top-down flash while also creating a smooth, blended light pattern, the bottom portion of the curve can be more diverging than the top portion of the curve.

An optic coupler can be mounted to the reflector housing, for covering electrical connections at the substrate of the LED package and/or for guiding or reflecting light emitted by the LED package. For example, the optic coupler can include a member with a central channel that is aligned with one or more of the LEDs of the LED package such that the channel guides light emitted by the LEDs while portions of the member around the channel cover the electrical connections at the substrate of the LED package. The optic coupler can have any of a number of different geometries that may or may not correspond to a configuration of the LED package. For example, depending on the sizes and locations of the electrical connections at the substrate, the portion of the optic coupler around the channel can have a substantially square, rectangular, rounded, conical, or frusto-conical shape.

The LED module can be used in both new construction and retrofit applications. The retrofit applications can include placing the LED module in an existing LED or non-LED fixture. To accommodate installation in a non-LED fixture, the LED module can further include a member comprising a profile that substantially corresponds to an interior profile of a can of the non-LED fixture such that the member creates a junction box between the member and a top of the can when the LED module is mounted in the can. To install the LED module, a person can electrically couple an Edison base adapter to both the existing, non-LED fixture and the LED module. For example, a person can cut at least one wire to remove an Edison base from the existing fixture, cut at least one other wire to remove an Edison screw-in plug from the Edison base adapter, and connect together the cut wires to electrically couple the Edison base adapter and the existing fixture. Alternatively, a person can release a socket from the existing fixture and screw the Edison base adapter into the socket to electrically couple the Edison base adapter and the existing fixture. The junction box can house the Edison base adapter and at least a portion of the wires coupled thereto.

These and other aspects, features and embodiments of the invention will become apparent to a person of ordinary skill in the art upon consideration of the following detailed description of illustrated embodiments exemplifying the best mode for carrying out the invention as presently perceived.

BRIEF DESCRIPTION OF THE DRAWINGS

For a more complete understanding of the present invention and the advantages thereof, reference is now made to the following description, in conjunction with the accompanying figures briefly described as follows. The patent or application file contains at least one drawing executed in color. Copies of this patent or patent application publication with color drawing(s) will be provided by the Office upon request and payment of the necessary fee.

DETAILED DESCRIPTION OF EXEMPLARY EMBODIMENTS

Figure 1:
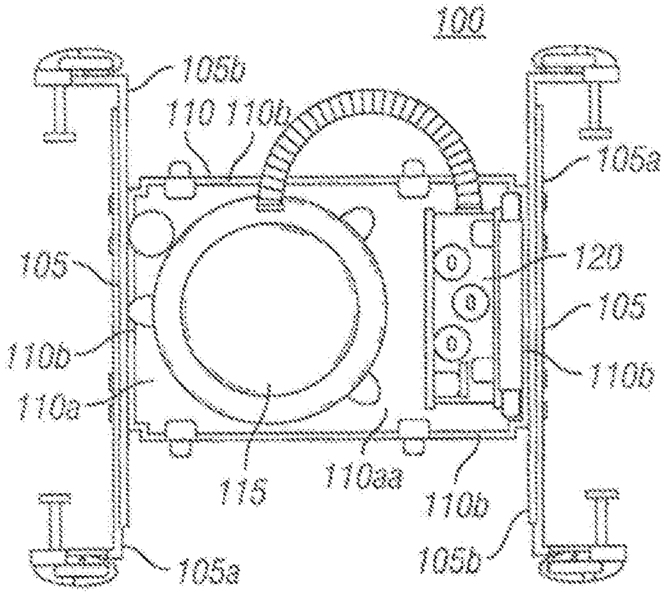
FIG. 1 is an elevational top view of hanger bars, a plaster frame, a can, and a junction box of a recessed lighting fixture, in accordance with certain exemplary embodiments.
Figure 2:
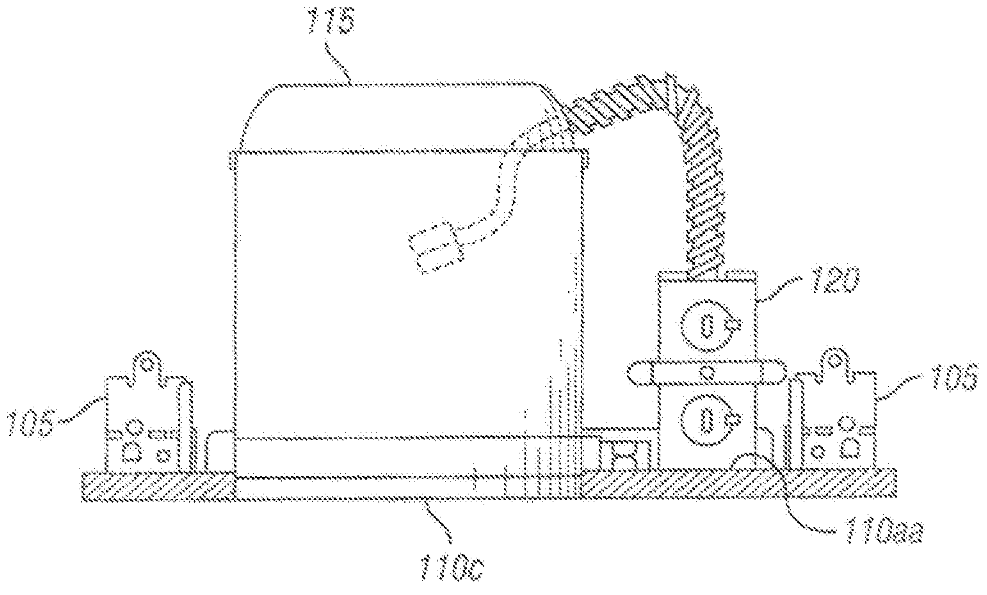
FIG. 2 is an elevational cross-sectional side view of the recessed lighting fixture of FIG. 1, in accordance with certain exemplary embodiments.
Figure 3:
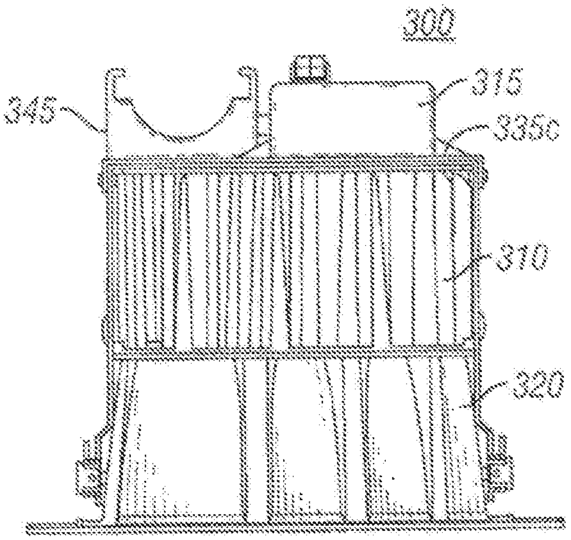
FIG. 3 is an elevational side view of an LED module of a recessed lighting fixture, in accordance with certain exemplary embodiments.
Figure 4:
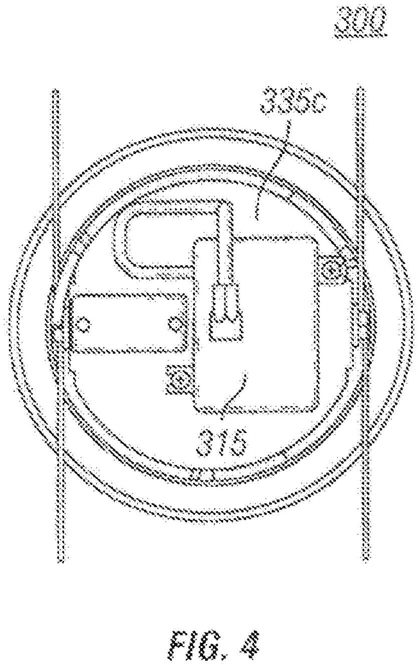
FIG. 4 is an elevational top view of the LED module of FIG. 3, in accordance with certain exemplary embodiments.
Figure 5:
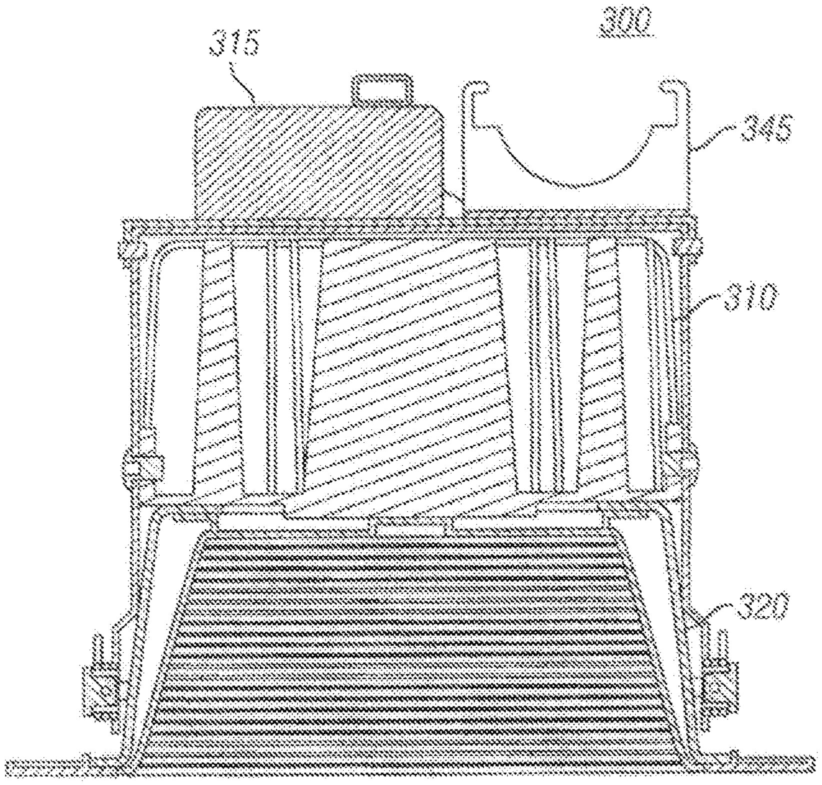
FIG. 5 is an elevational cross-sectional side view of the LED module of FIG. 3, in accordance with certain exemplary embodiments.
Figure 6:
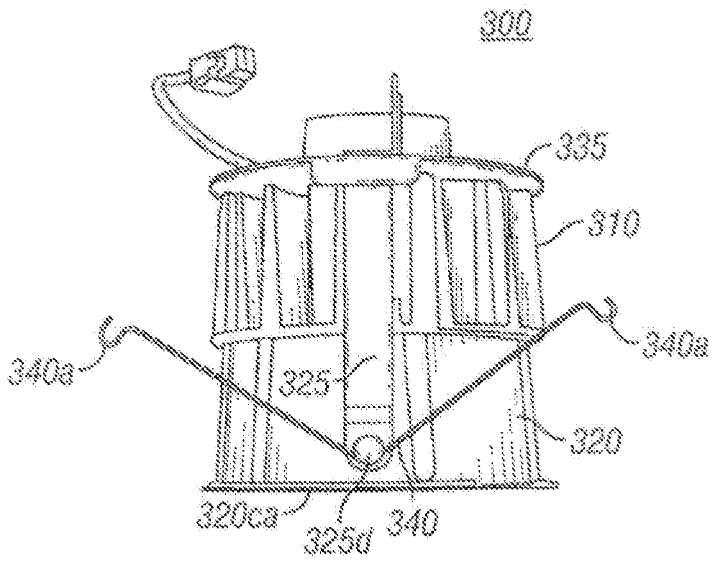
FIG. 6 is a perspective side view of the LED module of FIG. 3, in accordance with certain exemplary embodiments.

The following description of exemplary embodiments refers to the attached drawings, in which like numerals indicate like elements throughout the several figures. FIG. 1 is an elevational top view of hanger bars 105, a plaster frame 110, a can-shaped receptacle for housing a light source (a "can") 115, and a junction box 120 of a recessed lighting fixture 100, according to certain exemplary embodiments. FIG. 2 is an elevational cross-sectional side view of the hanger bars 105, plaster frame 110, can 115, and junction box 120 of the recessed lighting fixture 100 of FIG. 1, in accordance with certain exemplary embodiments. With reference to FIGS. 1 and 2, the hanger bars 105 are configured to be mounted between spaced supports or joists (not shown) within a ceiling (not shown). For example, ends of the hanger bars 105 can be fastened to vertical faces of the supports or joists by nailing or other means. In certain exemplary embodiments, the hanger bars 105 can include integral fasteners for attaching the hanger bars 105 to the supports or joists, substantially as described in co-pending U.S. patent application Ser. No. 10/090,654, titled "Hanger Bar for Recessed Luminaires with Integral Nail," and U.S. patent application Ser. No. 12/122,945, titled "Hanger Bar for Recessed Luminaires with Integral Nail," the complete disclosures of which are hereby fully incorporated herein by reference.

The distance between the supports or joists can vary to a considerable degree. Therefore, in certain exemplary embodiments, the hanger bars 105 can have adjustable lengths. Each hanger bar 105 includes two inter-fitting members 105*a* and 105*b* that are configured to slide in a telescoping manner to provide a desired length of the hanger bar 105. A person of ordinary skill in the art having the benefit of the present disclosure will recognize that many other suitable means exist for providing adjustable length hanger bars 105. For example, in certain alternative exemplary embodiments, one or more of the hanger bars described in U.S. Pat. No. 6,105,918, titled "Single Piece Adjustable Hanger Bar for Lighting Fixtures," the complete disclosure of which is hereby fully incorporated herein, may be utilized in the lighting fixture 100 of FIG. 1.

The plaster frame 110 extends between the hanger bars 105 and includes a generally rectangular, flat plate 110*a* with upturned edges 110*b*. For example, the flat plate 110*a* can rest on a top surface of the ceiling. The junction box 120 is mounted to a top surface 110*aa* of the flat plate 110*a*. The junction box 120 is a box-shaped metallic container that typically includes insulated wiring terminals and knock-outs for connecting external wiring (not shown) to an LED driver (not shown) disposed within the can 115 of the light fixture 100 or elsewhere within the light fixture 100.

In certain exemplary embodiments, the plaster frame 110 includes a generally circular-shaped aperture 110*c* sized for receiving at least a portion of the can 115 therethrough. The can 115 typically includes a substantially dome-shaped member configured to receive an LED module (not shown) that includes at least one LED light source (not shown). The aperture 110*c* provides an illumination pathway for the LED light source. A person of ordinary skill in the art having the benefit of the present disclosure will recognize that, in certain alternative exemplary embodiments, the aperture 110*c* can have another, non-circular shape that corresponds to an outer profile of the can 115.

FIGS. 3-8 illustrate an exemplary LED module 300 of the recessed lighting fixture 100 of FIG. 1. The exemplary LED module 300 can be configured for installation within the can 115 of the lighting fixture 100 of FIG. 1. The LED module 300 includes an LED package 305 mounted to a heat sink 310. The LED package 305 may be mounted directly to the heat sink 310 or with one or more other components mounted in-between the LED package 305 and the heat sink 310.

The LED package 305 includes one or more LEDs mounted to a common substrate 306. The substrate 306 includes one or more sheets of ceramic, metal, laminate, circuit board, mylar, or another material. Each LED includes a chip of semi-conductive material that is treated to create a positive-negative ("p-n") junction. When the LED package 305 is electrically coupled to a power source, such as a driver 315, current flows from the positive side to the negative side of each junction, causing charge carriers to release energy in the form of incoherent light.

The wavelength or color of the emitted light depends on the materials used to make the LED package 305. For example, a blue or ultraviolet LED can include gallium nitride ("GaN") or indium gallium nitride ("InGaN"), a red LED can include aluminum gallium arsenide ("AlGaAs"), and a green LED can include aluminum gallium phosphide ("AlGaP"). Each of the LEDs in the LED package 305 can produce the same or a distinct color of light. For example, the LED package 305 can include one or more white LED's and one or more non-white LEDs, such as red, yellow, amber, or blue LEDs, for adjusting the color temperature output of the light emitted from the fixture 100. A yellow or multi-chromatic phosphor may coat or otherwise be used in a blue or ultraviolet LED to create blue and red-shifted light that essentially matches blackbody radiation. The emitted light approximates or emulates "white," incandescent light to a human observer. In certain exemplary embodiments, the emitted light includes substantially white light that seems slightly blue, green, red, yellow, orange, or some other color or tint. In certain exemplary embodiments, the light emitted from the LEDs in the LED package 305 has a color temperature between 2500 and 5000 degrees Kelvin.

In certain exemplary embodiments, an optically transmissive or clear material (not shown) encapsulates at least a portion of the LED package 305 and/or each LED therein. This encapsulating material provides environmental protection while transmitting light from the LEDs. For example, the encapsulating material can include a conformal coating, a silicone gel, a cured/curable polymer, an adhesive, or some other material known to a person of ordinary skill in the art having the benefit of the present disclosure. In certain exemplary embodiments, phosphors are coated onto or dispersed in the encapsulating material for creating white light. In certain exemplary embodiments, the white light has a color temperature between 2500 and 5000 degrees Kelvin.

In certain exemplary embodiments, the LED package 305 includes one or more arrays of LEDs that are collectively configured to produce a lumen output from 1 lumen to 5000 lumens in an area having less than two inches in diameter or in an area having less than two inches in length and less than two inches in width. In certain exemplary embodiments, the LED package 305 is a CL-L220 package, CL-L230 package, CL-L240 package, CL-L102 package, or CL-L190 package manufactured by Citizen Electronics Co., Ltd. By using a single, relatively compact LED package 305, the LED module 300 has one light source that produces a lumen output that is equivalent to a variety of lamp types, such as incandescent lamps, in a source that takes up a smaller volume within the fixture. Although illustrated in FIGS. 7 and 8 as including LEDs arranged in a substantially square geometry, a person of ordinary skill in the art having the benefit of the present disclosure will recognize that the LEDs can be arranged in any geometry. For example, the LEDs can be arranged in circular or rectangular geometries in certain alternative exemplary embodiments.

The LEDs in the LED package 305 are attached to the substrate 306 by one or more solder joints, plugs, epoxy or bonding lines, and/or other means for mounting an electrical/optical device on a surface. Similarly, the substrate 306 is mounted to a bottom surface 310*a* of the heat sink 310 by one or more solder joints, plugs, epoxy or bonding lines, and/or other means for mounting an electrical/optical device on a surface. For example, the substrate 306 can be mounted to the heat sink 310 by a two-part arctic silver epoxy.

The substrate 306 is electrically connected to support circuitry (not shown) and/or the driver 315 for supplying electrical power and control to the LED package 305. For example, one or more wires (not shown) can couple opposite ends of the substrate 306 to the driver 315, thereby completing a circuit between the driver 315, substrate 306, and LEDs. In certain exemplary embodiments, the driver 315 is configured to separately control one or more portions of the LEDs to adjust light color or intensity.

As a byproduct of converting electricity into light, LEDs generate a substantial amount of heat that raises the operating temperature of the LEDs if allowed to accumulate. This can result in efficiency degradation and premature failure of the LEDs. The heat sink 310 is configured to manage heat output by the LEDs in the LED package 305. In particular, the heat sink 310 is configured to conduct heat away from the LEDs even when the lighting fixture 100 is installed in an insulated ceiling environment. The heat sink 310 is composed of any material configured to conduct and/or convect heat, such as die cast metal.

Figure 7:
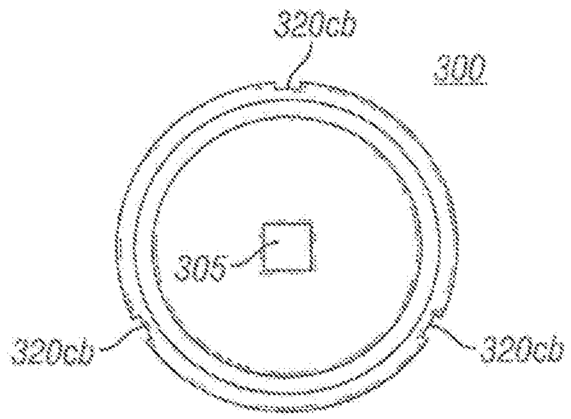
FIG. 7 is an elevational bottom view of the LED module of FIG. 3, in accordance with certain exemplary embodiments.
Figure 8:
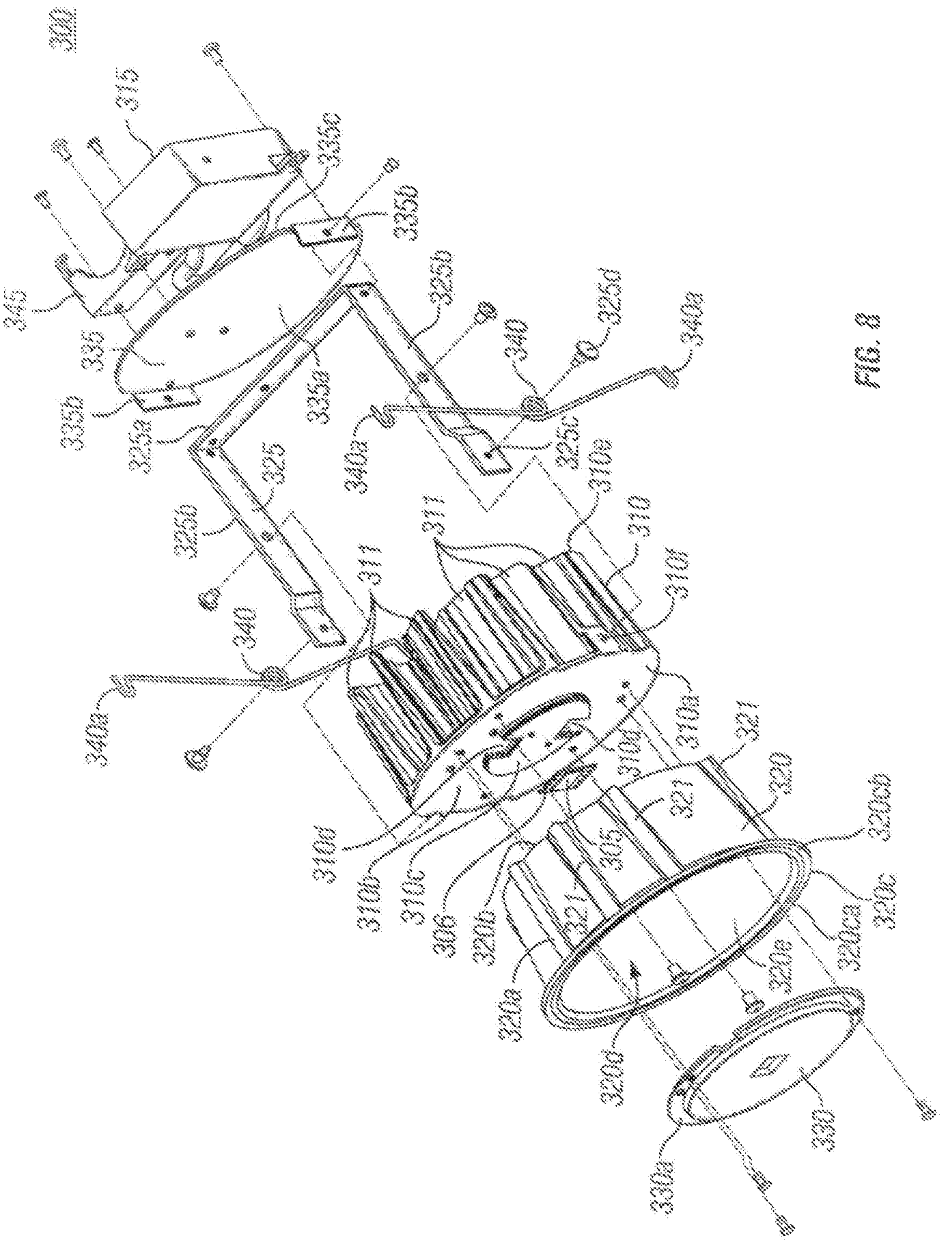
FIG. 8 is a perspective exploded side view of the LED module of FIG. 3, in accordance with certain exemplary embodiments.
Figure 9:
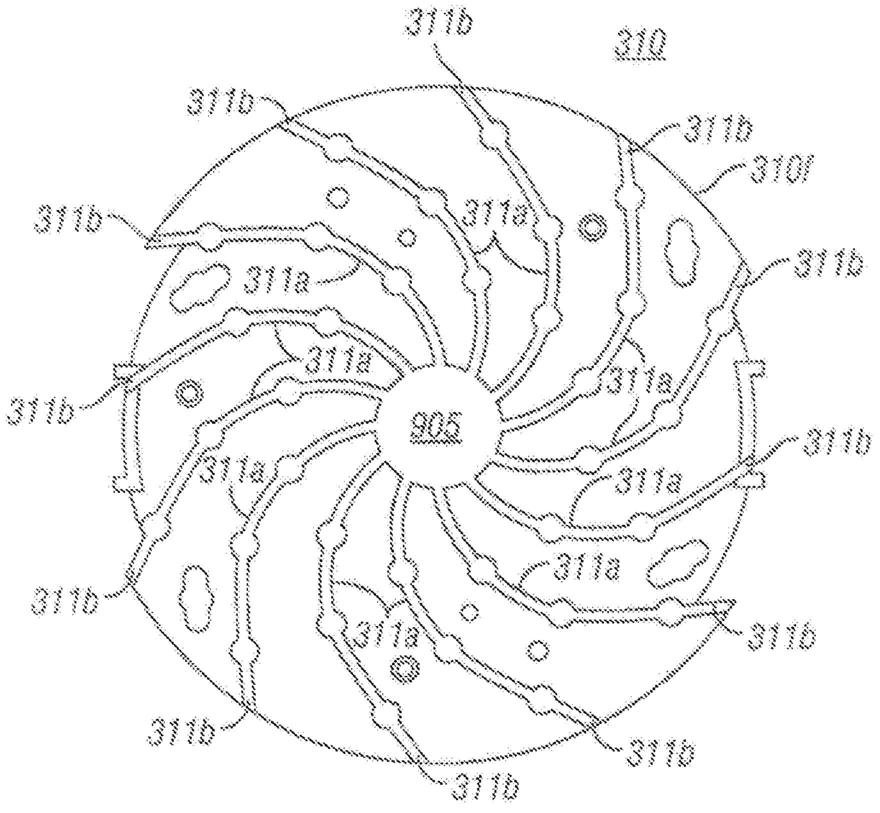
FIG. 9 is an elevational cross-sectional top view of a heat sink of the LED module of FIG. 3, in accordance with certain exemplary embodiments.
Figure 10:
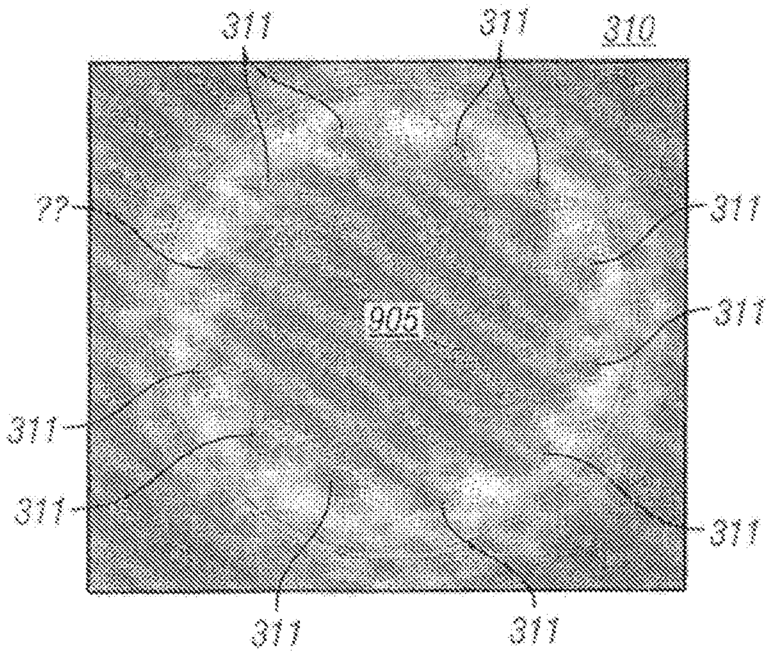
FIG. 10 illustrates a thermal scan of the heat sink of the LED module of FIG. 3, in accordance with certain exemplary embodiments.

FIG. 9 is an elevational cross-sectional top view of the exemplary heat sink 310. FIG. 10 illustrates a thermal scan of the exemplary heat sink 310 in operation. With reference to FIGS. 3-10, the bottom surface 310*a* of the heat sink 310 includes a substantially round member 310*b* with a protruding center member 310*c* on which the LED package 305 is mounted. In certain exemplary embodiments, the center member 310*c* includes two notches 310*d* that provide a pathway for wires (not shown) that extend between the driver 315 and the ends of the substrate 306. In certain alternative exemplary embodiments, three or more notches 310*d* may be included to provide pathways for wires. In certain alternative exemplary embodiments, the bottom surface 310*a* may include only a single, relatively flat member without any protruding center member 310*c*.

Fins 311 extend substantially perpendicular from the bottom surface 310*a*, towards a top end 310*e* of the heat sink 310. The fins 311 are spaced around a substantially central core 905 of the heat sink 310. The core 905 is a member that is at least partially composed of a conductive material. The core 905 can have any of a number of different shapes and configurations. For example, the core 905 can be a solid or non-solid member having a substantially cylindrical or other shape. Each fin 311 includes a curved, radial portion 311*a* and a substantially straight portion 311*b*. In certain exemplary embodiments, the radial portions 311*a* are substantially symmetrical to one another and extend directly from the core 905. In certain alternative exemplary embodiments, the radial portions 311*a* are not symmetrical to one another. Each straight portion 311*b* extends from its corresponding radial portion 311*a*, towards an outer edge 310*f* of the heat sink 310, substantially along a tangent of the radial portion 311*a*.

The radius and length of the radial portion 311*a* and the length of the straight portion 311*b* can vary based on the size of the heat sink 310, the size of the LED module 300, and the heat dissipation requirements of the LED module 300. By way of example only, one exemplary embodiment of the heat sink 310 can include fins 311 having a radial portion 311*a* with a radius of 1.25 inches and a length of 2 inches, and a straight portion 311*b* with a length of 1 inch. In certain alternative exemplary embodiments, some or all of the fins 311 may not include both a radial portion 311*a* and a straight portion 311*b*. For example, the fins 311 may be entirely straight or entirely radial. In certain additional alternative exemplary embodiments, the bottom surface 310*a* of the heat sink 310 may not include the round member 310*b*. In these embodiments, the LED package 305 is coupled directly to the core 905, rather than to the round member 310*b*.

As illustrated in FIG. 10, the heat sink 310 is configured to dissipate heat from the LED package 305 along a heat-transfer path that extends from the LED package 305, through the bottom surface 310*a* of the heat sink, and to the fins 311 via the core 905. The fins 311 receive the conducted heat and transfer the conducted heat to the surrounding environment (typically air in the can 115 of the lighting fixture 100) via convection. For example, heat from the LEDs can be transferred along a path from the LED package 305 to the core 905, from the core 905 to the radial portions 311*a* of the fins 311, from the radial portions 311*a* of the fins 311 to their corresponding straight portions 311*b*, and from the corresponding straight portions 311*b* to a surrounding environment. Heat also can be transferred by convection directly from the core 905 and/or the fins 311 to one or more gaps between the fins 311.

Figure 11:
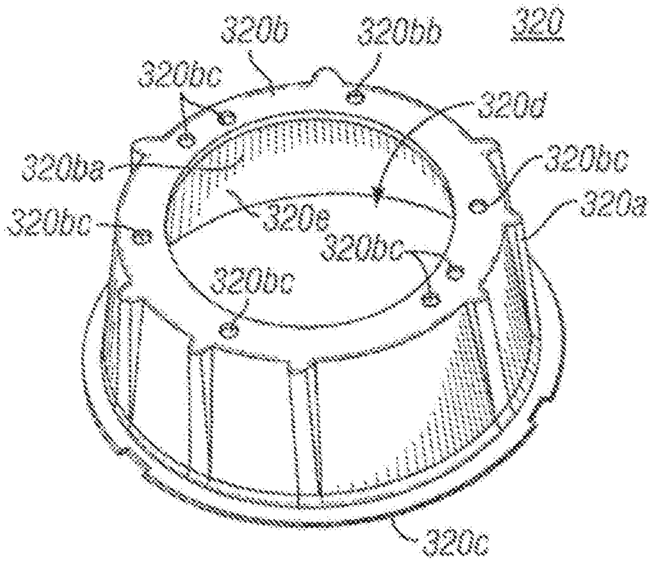
FIG. 11 is a perspective side view of a reflector housing of the LED module of FIG. 3, in accordance with certain exemplary embodiments.

In certain exemplary embodiments, a reflector housing 320 is coupled to the bottom surface 310*a* of the heat sink 310. A person of ordinary skill in the art will recognize that the reflector housing 320 can be coupled to another portion of the LED module 300 or the lighting fixture 100 in certain alternative exemplary embodiments. FIG. 11 illustrates the exemplary reflector housing 320. With reference to FIGS. 3-8 and 11, the reflector housing 320 includes a substantially round member 320*a* having a top end 320*b* and a bottom end 320*c*. Each end 320*b* and 320*c* includes an aperture 320*ba* and 320*ca*, respectively. A channel 320*d* extends through the reflector housing 320 and connects the apertures 320*ba* and 320*ca*.

The top end 320*b* includes a substantially round top surface 320*bb* disposed around at least a portion of the channel 320*d*. The top surface 320*bb* includes one or more holes 320*bc* capable of receiving fasteners that secure the reflector housing 320 to the heat sink 310. Each fastener includes a screw, nail, snap, clip, pin, or other fastening device known to a person of ordinary skill in the art having the benefit of the present disclosure. In certain alternative exemplary embodiments, the reflector housing 320 does not include the holes 320*bc*. In those embodiments, the reflector housing 320 is formed integrally with the heat sink 310 or is secured to the heat sink 310 via means, such as glue or adhesive, that do not require holes for fastening. In certain exemplary embodiments, the reflector housing 320 is configured to act as a secondary heat sink for conducting heat away from the LEDs. For example, the reflector housing 320 can assist with heat dissipation by convecting cool air from the bottom of the light fixture 100 towards the LED package 305 via one or more ridges 321.

Figure 12:
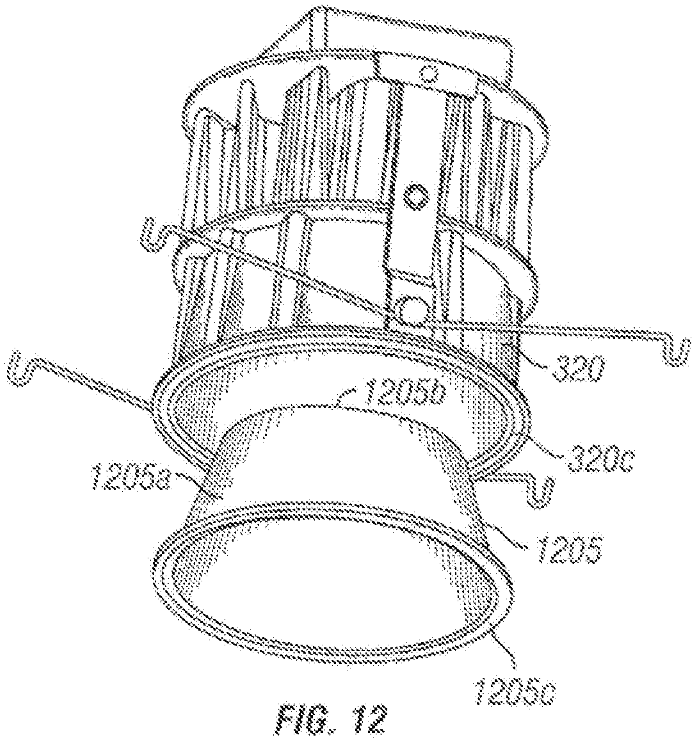
FIG. 12 is a perspective side view of a reflector being inserted in the reflector housing of FIG. 11, in accordance with certain exemplary embodiments.

The reflector housing 320 is configured to receive a reflector 1205 (FIG. 12) composed of a material for reflecting, refracting, transmitting, or diffusing light emitted by the LED package 305. The term “reflector” is used herein to refer to any material configured to serve as an optic in a light fixture, including any material configured to reflect, refract, transmit, or diffuse light. FIG. 12 is a perspective side view of the exemplary reflector 1205 being inserted in the channel 320*d* of the reflector housing 320, in accordance with certain exemplary embodiments. With reference to FIGS. 3-8, 11, and 12, when the reflector 1205 is installed in the reflector housing 320, outer side surfaces 1205*a* of the reflector 1205 are disposed along corresponding interior surfaces 320*e* of the reflector housing 320. In certain exemplary embodiments, a top end 1205*b* of the reflector 1205 abuts an edge surface 330*a* of an optic coupler 330, which is mounted to a bottom edge 310*a* of the top surface 320*bb*. The reflector 1205 is described in more detail below with reference to FIG. 20. The optic coupler 330 includes a member configured to cover the electrical connections at the substrate 306, to allow a geometric tolerance between the LED package 305 and the reflector 1205, and to guide light emitted by the LED package 305. The optic coupler 330 and/or a material applied to the optic coupler 330 can be optically refractive, reflective, transmissive, specular, semi-specular, or diffuse. The optic coupler 330 is described in more detail below with reference to FIGS. 17-19.

Figure 13:
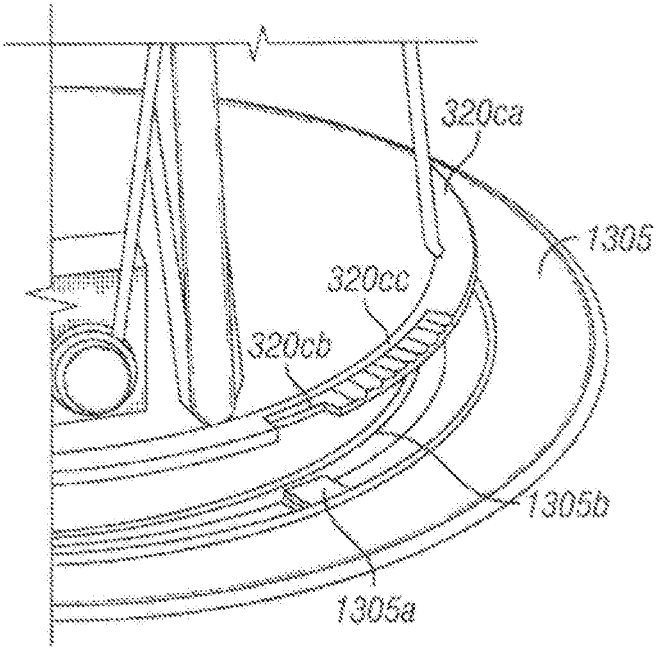
FIG. 13 is a perspective side view of a trim ring aligned for installation with the reflector housing of FIG. 11, in accordance with certain exemplary embodiments.

The bottom end 320*c* of the reflector housing 320 includes a bottom surface 320*ca* that extends away from the channel 320*d*, forming a substantially annular ring around the channel 320*d*. The surface 320*ca* includes slots 320*cb* that are each configured to receive a corresponding tab 1305*a* from a trim ring 1305 (FIG. 13). FIG. 13 illustrates a portion of the trim ring 1305 aligned for installation with the reflector housing 320. With reference to FIGS. 3-8 and 11-13, proximate each slot 320*cb*, the surface 320*ca* includes a ramped surface 320*cc* that enables installation of the trim ring 1305 on the reflector housing 320 via a twisting maneuver. Specifically, the trim ring 1305 can be installed on the reflector housing 320 by aligning each tab 1305*a* with its corresponding slot 320*cb* and twisting the trim ring 1305 relative to the reflector housing 320 so that each tab 1305*a* travels up its corresponding ramped surface 320*cc* to a higher position along the bottom surface 320*ca*. Each ramped surface 320*cc* has a height that slowly rises along the perimeter of the housing 320.

The trim ring 1305 provides an aesthetically pleasing frame for the lighting fixture 100. The trim ring 1305 may have any of a number of colors, shapes, textures, and configurations. For example, the trim ring 1305 may be white, black, metallic, or another color and may also have a thin profile, a thick profile, or a medium profile. The trim ring 1305 retains the reflector 1205 within the reflector housing 320. In particular, when the reflector 1205 and trim ring 1305 are installed in the light fixture 100, at least a portion of a bottom end 1205*b* of the reflector 1205 rests on a top surface 1305*b* of the trim ring 1305.

Referring now to FIGS. 3-8, a bracket 325 couples torsion springs 340 to opposite side surfaces 310*f* of the heat sink 310. The bracket 325 includes a top member 325*a* and opposing, elongated side members 325*b* that extend substantially perpendicularly from the top member 325*a*, towards the bottom end 320*c* of the reflector housing 320*c*. The bracket 325 is coupled to the heat sink 310 via one or more screws, nails, snaps, clips, pins, and/or other fastening devices known to a person of ordinary skill in the art having the benefit of the present disclosure.

Each side member 325*b* includes an aperture 325*c* configured to receive a rivet 325*d* or other fastening device for mounting one of the torsion springs 340 to the heat sink 310. Each torsion spring 340 includes opposing bracket ends 340*a* that are inserted inside corresponding slots (not shown) in the can 115 of the light fixture 100. To install the LED module 300 in the can 115, the bracket ends 340*a* are squeezed together, the LED module 300 is slid into the can 115, and the bracket ends 340*a* are aligned with the slots and then released such that the bracket ends 340*a* enter the slots.

A mounting bracket 335 is coupled to the top member 325*a* and/or the top end of heat sink 310 via one or more screws, nails, snaps, clips, pins, and/or other fastening devices known to a person of ordinary skill in the art having the benefit of the present disclosure. The mounting bracket 335 includes a substantially round top member 335*a* and protruding side members 335*b* that extend substantially perpendicular from the top member 335*a*, towards the bottom end 320*c* of the reflector housing 320. In certain exemplary embodiments, the mounting bracket 335 has a profile that substantially corresponds to an interior profile of the can 115. This profile allows the mounting bracket 335 to create a junction box (or "j-box") in the can 115 when the LED module 300 is installed in the light fixture 100. In particular, as described in more detail below with reference to FIG. 14, electrical junctions between the light fixture 100 and the electrical system (not shown) at the installation site may be disposed within the substantially enclosed space between the mounting bracket 335 and the top of the can 115 (the junction box), when the LED module 300 is installed.

In certain exemplary embodiments, the driver 315 and an Edison base socket bracket 345 are mounted to a top surface 350*c* of the top member 350*a* of the mounting bracket 335. Alternatively, the driver 315 can be disposed in another location in or remote from the light fixture 100. As set forth above, the driver 315 supplies electrical power and control to the LED package 305. As described in more detail below with reference to FIGS. 14-16, the Edison base socket bracket 345 is a bracket that is configured to receive an Edison base socket 1505 (FIGS. 15-16) and an Edison base adapter 1520 (FIGS. 15-16) in a retrofit installation of the LED module 300 in an existing, non-LED fixture. This bracket 345 allows the LED module 300 to be installed in both new construction and retrofit applications. In certain alternative exemplary embodiments, the bracket 345 may be removed for a new construction installation.

Figure 14:
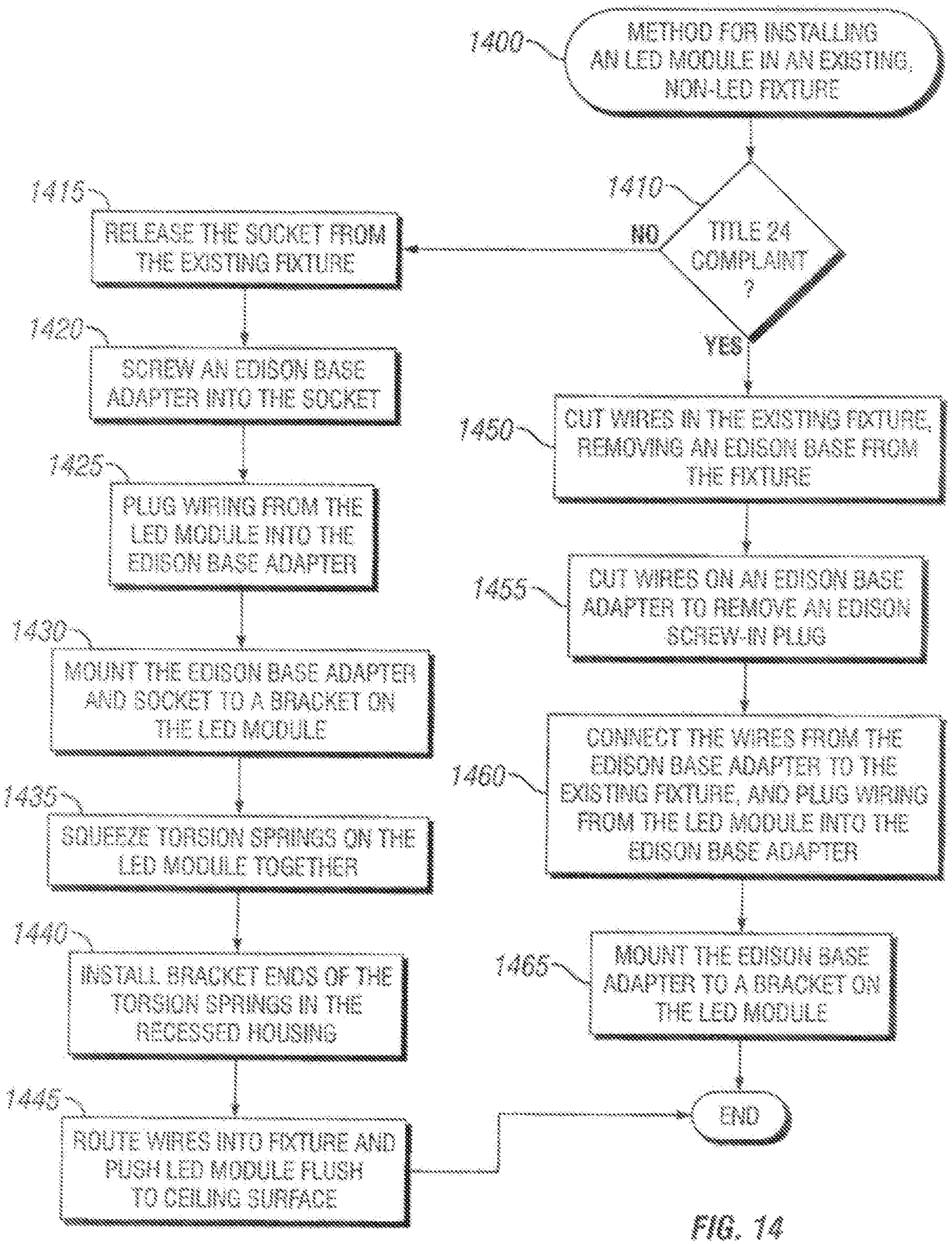
FIG. 14 is a flow chart diagram illustrating a method for installing the LED module of FIG. 3 in an existing, non-LED fixture, in accordance with certain exemplary embodiments.
Figure 15:
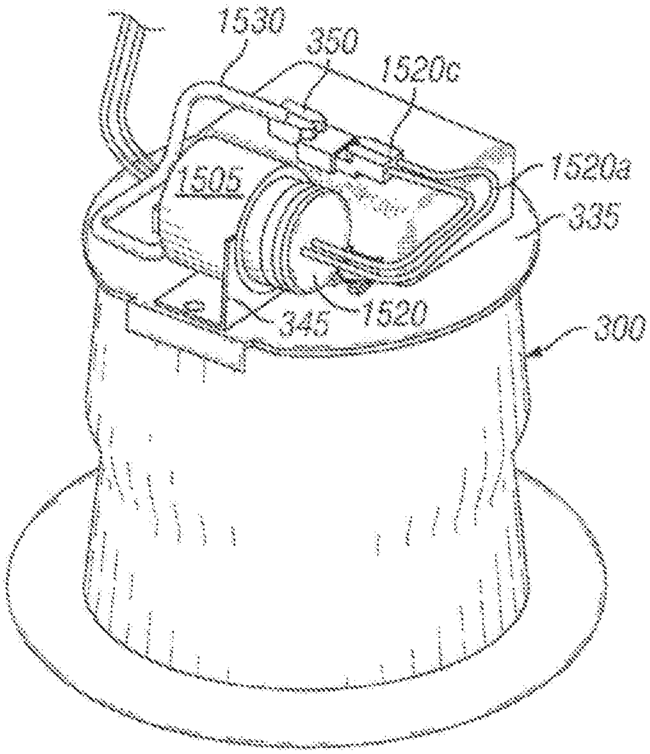
FIG. 15 is a perspective side view of the LED module of FIG. 3 connected to a socket of an existing, non-LED fixture via an Edison base adapter, in accordance with certain exemplary embodiments.
Figure 16:
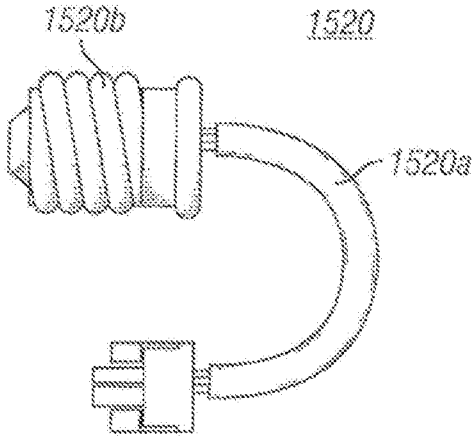
FIG. 16 is an elevational side view of the Edison base adapter of FIG. 15, in accordance with certain exemplary embodiments.

FIG. 14 is a flow chart diagram illustrating a method 1400 for installing the LED module 300 in an existing, non-LED fixture, in accordance with certain exemplary embodiments. FIGS. 15 and 16 are views of an exemplary Edison base adapter 1520 and of the LED module being 300 connected to an Edison base socket 1505 of the existing, non-LED fixture via the Edison base adapter 1520. The exemplary method 1400 is illustrative and, in alternative embodiments of the invention, certain steps can be performed in a different order, in parallel with one another, or omitted entirely, and/or certain additional steps can be performed without departing from the scope and spirit of the invention. The method 1400 is described below with reference to FIGS. 3-8 and 14-16.

In step 1410, an inquiry is conducted to determine whether the installation of the LED module 300 in the existing fixture will be compliant with Title 24 of the California Code of Regulations, titled "The Energy Efficiency Standards for Residential and Nonresidential Buildings," dated Oct. 1, 2005. Title 24 compliant installations require removal of the Edison base socket 1505 in the existing fixture. An installation that does not need to be Title 24 compliant does not require removal of the Edison base socket 1505.

If the installation will not be Title 24 compliant, then the "no" branch is followed to step 1415. In step 1415, the Edison base socket 1505 from the existing fixture is released. For example, a person can release the Edison base socket 1505 by removing the socket 1505 from a plate of the existing fixture. In step 1420, the person screws the Edison base adapter 1520 into the Edison base socket 1505. The Edison base adapter 1520 electrically couples the driver 315 of the LED module 300 to the power source of the existing fixture via the socket 1505 of the existing fixture and/or via wires connected to the socket 1505, as described below, with reference to steps 1455-1460.

In step 1425, the person plugs wiring 1530 from the LED module 300 into the Edison base adapter 1520. For example, the person can plug one or more quick-connect or plug connectors 350 from the driver 315 into the Edison base adapter 1520. Alternatively, the person may connect wires without connectors from the driver to the Edison base adapter 1520. In step 1430, the person mounts the Edison base adapter 1520 and the socket 1505 to the mounting bracket 335 on the LED module 300. For example, the person can snap, slide, or twist the Edison base adapter 1520 and socket 1505 onto the Edison base socket bracket 345 on the mounting bracket 335, and/or the person can use one or more screws, nails, snaps, clips, pins, and/or other fastening devices to mount the Edison base adapter 1520 and socket 1505 to the Edison base socket bracket 345 and/or mounting bracket 335.

In step 1435, the person squeezes the torsion springs 340 so that the bracket ends 340*a* of each torsion spring 340 move towards one another. The person slides the LED module 300 into a can 115 of the existing light fixture, aligns the bracket ends 340*a* with slots in the can 115, and releases the bracket ends 340*a* to install the bracket ends 340*a* within the can 115, in step 1440. In step 1445, the person routes any exposed wires (not shown) into the existing fixture and pushes the LED module 300 flush to a ceiling surface.

Returning to step 1410, if the installation will be Title 24 compliant, then the "yes" branch is followed to step 1450, where the person cuts wires in the existing fixture to remove the Edison base, including the Edison base socket 1505, from the existing fixture. In step 1455, the person cuts wires 1520*a* on the Edison base adapter 1520 to remove an Edison screw-in plug 1520*b* on the adapter 1520. The person connects the wires 1520*a* from the Edison base adapter 1520 to wires (not shown) in the existing fixture, and plugs wiring 1530 from the LED module 300 into a connector 1520*c* on the adapter 1520, in step 1460. These connections complete an electrical circuit between a power source at the installation site, the Edison base adapter 1520, and the LED module 300, without using an Edison base socket 1505. In step 1465, the person mounts the Edison base adapter 1520 to the mounting bracket 335 on the LED module 300, substantially as described above in connection with step 1430.

As set forth above, the mounting bracket 335 has a profile that substantially corresponds to an interior profile of the can 115. This profile allows the mounting bracket 335 to create a junction box (or "j-box") in the can 115 when the LED module 300 is installed in the light fixture 100 by substantially enclosing the space between the mounting bracket 335 and the top of the can 115. In particular, the electrical junctions between the wires 1530, the driver 315, the Edison base adapter 1520, and, depending on whether the installation is Title 24 compliant, the socket 1505, may be disposed within the substantially enclosed space between the mounting bracket 335 and the top of the can 115 when the LED module 300 is installed.

Figure 17:
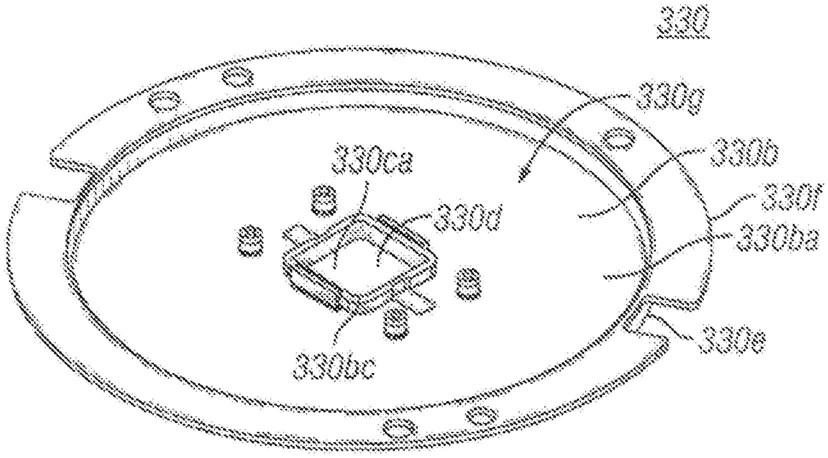
FIG. 17 is a perspective top view of an optic coupler of the LED module of FIG. 3, in accordance with certain exemplary embodiments.
Figure 18:
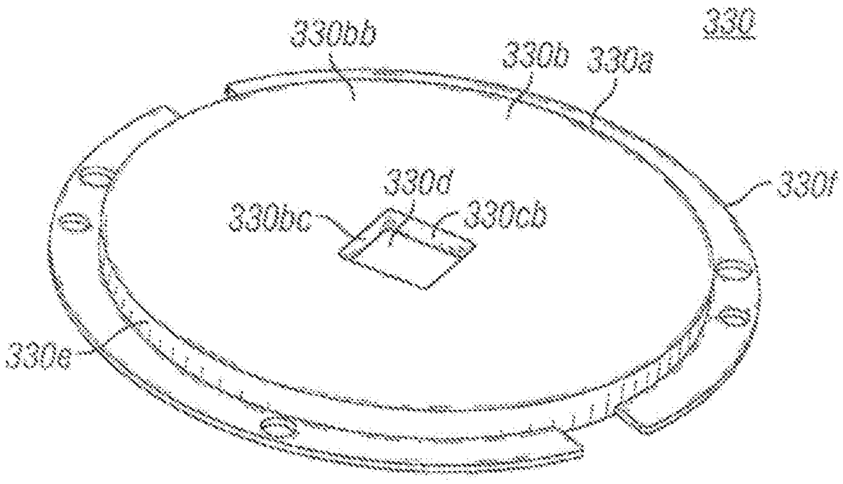
FIG. 18 is a perspective bottom view of the optic coupler of FIG. 17, in accordance with certain exemplary embodiments.

FIGS. 17 and 18 are views of the optic coupler 330 of the LED module 300, in accordance with certain exemplary embodiments. With reference to FIGS. 17 and 18, the optic coupler 330 includes a refractive, reflective, transmissive, specular, semi-specular, or diffuse member that covers the electrical connections at the substrate 306, to allow a geometric tolerance between the reflector 1205 and the LEDs in the LED package 305, and to guide light emitted by the LEDs.

In certain exemplary embodiments, the optic coupler 330 includes a center member 330*b* having a top surface 330*ba* and a bottom surface 330*bb*. Each surface 330*ba* and 330*bb* includes an aperture 330*ca* and 330*cb*, respectively. The apertures 330*ca* and 330*cb* are parallel to one another and are substantially centrally disposed in the center member 330*b*. A side member 330*bc* defines a channel 330*d* that extends through the center member 330*b* and connects the apertures 330*ca* and 330*cb*. In certain exemplary embodiments, the side member 330*bc* extends out in a substantially perpendicular direction from the top surface 330*ba*. Alternatively, the side member 330*bc* can be angled in a conical, semi-conical, or pyramidal fashion.

When the optic coupler 330 is installed in the LED module 300, the apertures 330*ca* and 330*cb* are aligned with the LEDs of the LED package 305 so that all of the LEDs are visible through the channel 330*d*. In certain exemplary embodiments, the geometry of the side member 330*bc* and/or one or both of the apertures 330*ca* and 330*cb* substantially corresponds to the geometry of the LEDs. For example, if the LEDs are arranged in a substantially square geometry, as shown in FIGS. 7 and 8, the side member 330*bc* and the apertures 330*ca* and 330*cb* can have substantially square geometries, as shown in FIGS. 17 and 18. Similarly, if the LEDs are arranged in a substantially round geometry, the side member 330*bc* and/or one or both of the apertures 330*ca* and 330*cb* can have a substantially round geometry. In certain exemplary embodiments, the optic coupler 330*d* is configured to guide light emitted by the LED package 305. For example, the emitted light can travel through the channel 330*d* and be reflected, refracted, diffused, and/or transmitted by the side member 330*bc* and/or the bottom surface 330*bb* of the center member 330*b*.

A side wall member 330*e* extends substantially perpendicularly from the top surface 330*ba* of the optic coupler 330. The side wall member 330*e* connects the center member 330*b* and an edge member 330*f* that includes the edge surface 330*a* of the optic coupler 330. The side wall member 330*e* has a substantially round geometry that defines a ring around the center member 330*b*. The edge member 330*f* extends substantially perpendicularly from a top end 330*ea* of the side wall member 330*e*. The edge member 330*f* is substantially parallel to the center member 330*b*.

The side wall member 330*e* and center member 330*b* define an interior region 330*g* of the optic coupler 330. The interior region 330*g* includes a space around the aperture 330*ca* that is configured to house the electrical connections at the substrate 306. In particular, when the optic coupler 330 is installed within the LED module 300, the optic coupler 330 covers the electrical connections on the substrate 306 by housing at least a portion of the connections in the interior region 330*g*. Thus, the electrical connections are not visible when the LED module 300 is installed.

Figure 19:
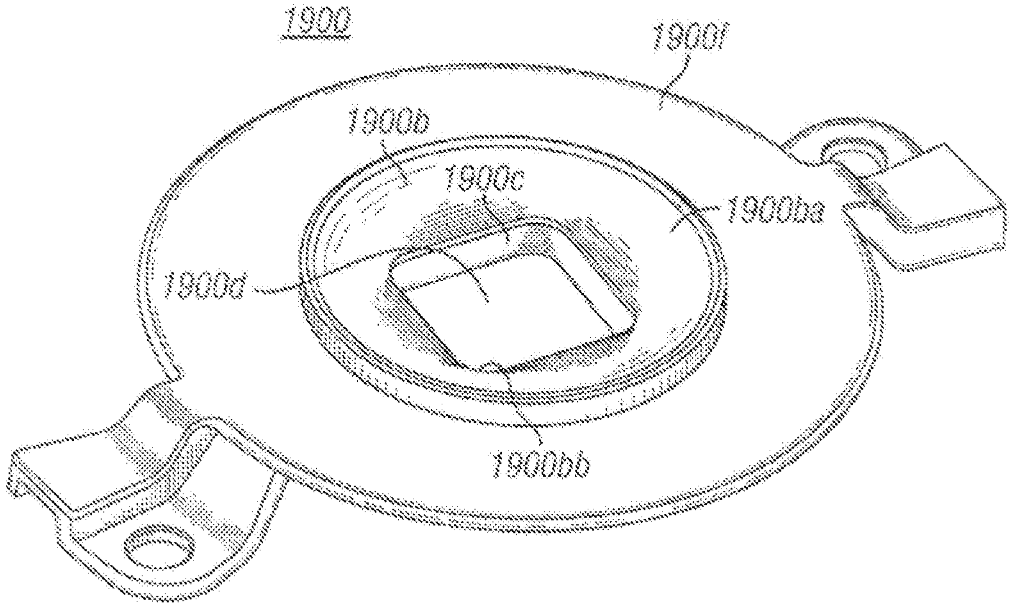
FIG. 19 is a perspective top view of an optic coupler of the LED module of FIG. 3, in accordance with certain alternative exemplary embodiments.

FIG. 19 is a perspective top view of an optic coupler 1900 of the LED module 300, in accordance with certain alternative exemplary embodiments. The optic coupler 1900 is substantially similar to the optic coupler 330, except that the optic coupler 1900 has a wider edge member 1900*f* and a narrower center member 1900*b* that has a substantially conical or frusto-conical geometry. In particular, a bottom surface 1900*ba* of the center member 1900*b* has a larger radius than a top surface 1900*bb* of the center member 1900*b*. Each surface 1900*ba* and 1900*bb* includes an aperture 1900*ca* and 1900*cb*, respectively, that connects a channel 1900*d* extending through the center member 1900*b*. The bottom surface 1900*ba* has a substantially angled profile that bows outward from the channel 1900*d*, defining the substantially conical or frusto-conical geometry of the center member 1900*b*. In certain exemplary embodiments, the geometry of the center member 1900*b* can reduce undesirable shadowing from the optic coupler 1900. In particular, the center member 1900*b* does not include sharp angled edges that could obstruct light from the LED package 305.

Although FIGS. 17-18 and 19 illustrate center members 330*b* and 1900*b* with square and conical geometries, respectively, a person of ordinary skill in the art having the benefit of the present disclosure will recognize that the center members 330*b* and 1900*b* can include any geometry. For example, in certain alternative exemplary embodiments, the optic coupler 300 or 1900 can include a center member that incorporates a hemispherical or cylindrical geometry.

Figure 20:
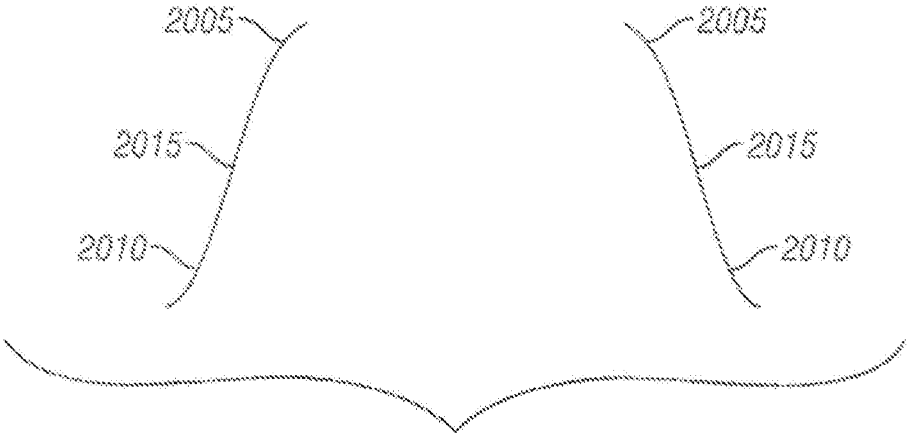
FIG. 20 is an exaggerated depiction of a profile of the reflector, in accordance with certain exemplary embodiments.

FIG. 20 is an exaggerated depiction of a cross-sectional profile of the reflector 1205, in accordance with certain exemplary embodiments. The profile includes a first region 2005 at the top of the reflector 1205 and a second region 2010 at the bottom of the reflector 1205. The second region 2010 is more diverging than the first region 2005. The regions 2005 and 2010 define a curve that resembles the shape of a side of a bell.

As is well known to a person of ordinary skill in the art having the benefit of the present disclosure, reflectors within a downlight need to create a specific light pattern that is pleasing to the eye, taking into account human visual perception. Most visually appealing downlights are designed such that the reflected image of the source light begins at the top of the reflector and works its way downward as an observer walks toward the fixture. This effect is sometimes referred to as "top down flash." It is generally accepted that people prefer light distributions that are more or less uniform, with smooth rather than abrupt gradients. Abrupt gradients are perceived as bright or dark bands in the light pattern.

Traditional reflector designs for downlights with large sources, such as incandescent or compact fluorescent lamps, are fairly straightforward. A parabolic or nearly parabolic section created from the edge rays or tangents from the light source will create a top down flash with the widest distribution possible with given perception constraints. With respect to the light pattern on a nearby surface, such as a floor, the light pattern is generally smooth due to the fact that the large source is reflected into a large, angular zone.

Designing a reflector for a small light source, such as an LED, is not as straightforward. In particular, it has traditionally been difficult to create a smooth light pattern when using an LED source. The reflector for a small source downlight, such as an LED downlight 100, needs to be more diverging than is typical with downlights having larger sources. The reflected portion of the light, nearest nadir, or the point directly below the light fixture, is the most critical area for a small source downlight. If the transition between the reflector image and the bare source alone is abrupt in the downlight, a bright or dark ring will be perceived in the light pattern.

To compensate, the reflector 1205 of the present invention becomes radically diverging near this zone to better blend the transition area. In particular, the bell-shape of the profile of the reflector 1205 defines at least one smooth curve with a substantially centrally disposed inflection point. A top portion of the curve (the first region 2005), reflects light in a more concentrated manner to achieve desired light at higher angles. For example, the top portion of the curve can reflect light near the top of the reflector 1205 starting at about 50 degrees. A bottom portion of the curve (the second region 2010) is more diverging than the top portion and reflects light over a large angular zone (down to zero degrees), blending out what would otherwise be a hard visible line in the light pattern. This shape has been shown to meet the requirement of a top-down flash while also creating a smooth, blended light pattern in the LED downlight fixture 100. Although particularly useful for LED downlights, a person of ordinary skill in the art having the benefit of the present disclosure will recognize that the design of the reflector 1205 may be used in any type of fixture, whether LED-based or not.

The precise shape of the reflector 1205 can depend on a variety of factors, including the size and shape of the light source, the size and shape of the aperture opening, and the desired photometric distribution. In certain exemplary embodiments, the shape of the reflector 1205 can be determined by defining a number of vertices and drawing a spline through the vertices, thereby creating a smooth, continuous curve that extends through the vertices. Although it might be possible to approximate this curve with an equation, the equation would change depending on a given set of variables. In one exemplary reflector 1205, the vertices of the spline were determined in a trial and error methodology with optical analysis software to achieve a desired photometric distribution. The variables set at the onset of the design were: the diameter of the aperture (5 inches), the viewing angle an observer can first see the light source or interior of the optical coupler through the aperture as measured from nadir, directly below the fixture (50 degrees), and the cutoff angle of the reflected light from the reflector as measured from nadir, directly below the fixture (50 degrees).

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

What is claimed is:

1. A luminaire for mounting in a ceiling, comprising:

a downlight module comprising:

an inner surface, a light emitting diode (LED) light source mechanically coupled to the inner surface of the downlight module, the LED light source comprising at least one first LED that emits a first light of a first color temperature and at least one second LED that emits a second light of a second color temperature such that the LED light source provides a combined output light having a color temperature between 2500 and 5000 Kelvin, a pair of mounting devices coupled to the downlight module on opposing sides of the downlight module, wherein the pair of mounting devices are configured to hold the downlight module above the ceiling and wherein the pair of mounting devices are mounted to an outside of the downlight module proximate to a light emitting opening of the downlight module;

a driver electrically coupled to the LED light source, wherein the driver is remotely located from the downlight module;

an adapter comprising a plug connector at one end of the adapter, wherein the plug connector is configured to electrically couple to the driver; and a complementary connector attached to the driver and wherein the plug connector is configured to releasably attach to the complementary connector.

2. The luminaire of claim 1, further comprising an Edison screw-in plug at a second end of the adapter, wherein the Edison screw-in plug is configured to electrically couple the driver to an Edison base socket.

3. The luminaire of claim 1, wherein the pair of mounting devices comprises a first torsion spring and a second torsion spring.

4. The luminaire of claim 1, wherein each of the pair of mounting devices includes at least one bracket end, wherein each of the bracket ends are squeezed together during installation of the downlight module above the ceiling.

5. The luminaire of claim 1, wherein the plurality of mounting devices are configured to engage a housing.

6. A downlight module comprising:

a light emitting diode (LED) light source that provides an output light, the LED light source comprising at least one first LED that emits a first light of a first color and at least one second LED that emits a second light of a second color, wherein the output light comprises the first light and the second light;

a driver electrically coupled to the LED light source;

a first torsion spring and a second torsion spring coupled to the downlight module, wherein the first torsion spring and second torsion spring are located on opposing sides of the downlight module;

an adapter comprising a plug connector at one end of the adapter, wherein the plug connector is configured to electrically couple to the driver; and a complementary connector attached to the driver, wherein the plug connector is configured to releasably attach to the complementary connector.

7. The downlight module of claim 6, wherein the first torsion spring and second torsion spring are mounted to an outside of the downlight module proximate to a light emitting opening of the downlight module.

8. The downlight module of claim 6, wherein the at least one first LED emits white light of a first color temperature and the at least one second LED emits white light of a second color temperature.

9. The downlight module of claim 8, wherein the output light is in a range between 2500 Kelvin and 5000 Kelvin.

10. The downlight module of claim 6, wherein the at least one second LED emits light that is one of green, red, yellow, or blue.

11. The downlight module of claim 6, wherein the at least one first LED emits light that is one of green, red, or blue, and the at least one second LED emits light that is another of green, red, or blue.

12. The downlight module of claim 6, wherein the at least one first light is white light and the at least one second light is non-white light.

13. The downlight module of claim 6, wherein the first torsion spring and the second torsion spring are coupled to an external surface of the downlight module.

14. The downlight module of claim 6, wherein the first torsion spring and the second torsion spring are configured to engage a light fixture housing.

15. The downlight module of claim 14, wherein the driver is located inside the light fixture housing once the downlight module is installed.

16. The downlight module of claim 6, wherein each of the first and second torsion springs includes a pair of bracket ends, wherein the bracket ends of each pair of bracket ends are squeezed together during installation of the downlight module above the ceiling.

17. The downlight module of claim 6, wherein the driver is remotely located from the downlight module.

* * * * *